US008666094B2

(12) United States Patent
Matsuzawa

(10) Patent No.: US 8,666,094 B2
(45) Date of Patent: *Mar. 4, 2014

(54) DRIVE CONTROL METHOD OF ELECTROSTATIC-TYPE ULTRASONIC TRANSDUCER, ELECTROSTATIC-TYPE ULTRASONIC TRANSDUCER, ULTRASONIC SPEAKER USING ELECTROSTATIC-TYPE ULTRASONIC TRANSDUCER, AUDIO SIGNAL REPRODUCING METHOD, SUPERDIRECTIONAL ACOUSTIC SYSTEM, AND DISPLAY

(75) Inventor: Kinya Matsuzawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 1816 days.

This patent is subject to a terminal disclaimer.

(21) Appl. No.: 11/566,797

(22) Filed: Dec. 5, 2006

(65) Prior Publication Data

US 2007/0127746 A1 Jun. 7, 2007

(30) Foreign Application Priority Data

Dec. 7, 2005 (JP) ................................ 2005-353275
Nov. 14, 2006 (JP) ................................ 2006-307860

(51) Int. Cl.
*H04R 3/00* (2006.01)
*H04B 3/00* (2006.01)
*H04R 25/00* (2006.01)

(52) U.S. Cl.
USPC .............................. 381/111; 381/191; 381/77

(58) Field of Classification Search
USPC .................. 381/77, 111, 190, 191, 337, 338; 367/181, 137, 170; 307/400
See application file for complete search history.

(56) References Cited

U.S. PATENT DOCUMENTS 6,946,928 B2 * 9/2005 Larson et al. ................. 333/189
7,668,323 B2 * 2/2010 Miyazaki ...................... 381/190
7,769,193 B2 * 8/2010 Matsuzawa .................. 381/111
7,804,971 B2 * 9/2010 Matsuzawa .................. 381/116
8,045,735 B2 * 10/2011 Matsuzawa et al. .......... 381/191
8,126,171 B2 * 2/2012 Sekino et al. ................ 381/191

FOREIGN PATENT DOCUMENTS

JP Y-46-007879 3/1971
JP Y-49-023624 3/1974
JP A-03-217199 9/1991
JP A-10-252444 9/1998

(Continued)

OTHER PUBLICATIONS

Dec. 13, 2011 Japanese Office Action issued in Japanese Application No. 2006-307860.

*Primary Examiner* — Ping Lee
(74) *Attorney, Agent, or Firm* — Oliff PLC

(57) ABSTRACT

A push-pull-type electrostatic-type ultrasonic transducer includes a first electrode having through holes, a second electrode having through holes each of which is paired with the corresponding through hole of the first electrode, and an oscillation film sandwiched between a pair of the first and second electrodes and having a conductive layer to which direct current bias voltage is applied. When a wavelength obtained from a resonance frequency at a mechanical oscillation resonance point of the oscillation film is λ, a thickness t of the respective fixed electrodes is (λ/4)·n or substantially (λ/4)·n (where λ: wavelength of ultrasonic wave, n: positive odd number). AC signals as modulation waves produced by modulating carrier waves in an ultrasonic frequency band by signal waves in an audio frequency band are applied between a pair of the electrodes.

3 Claims, 11 Drawing Sheets

(56) References Cited

FOREIGN PATENT DOCUMENTS

| | | |
|---|---|---|
| JP | A-11-351196 | 12/1999 |
| JP | A 2000-050387 | 2/2000 |
| JP | A 2000-050392 | 2/2000 |
| JP | A-2004-312394 | 11/2004 |
| JP | A-2005-039436 | 2/2005 |
| JP | A-2005-117103 | 4/2005 |
| JP | A-2005-223410 | 8/2005 |
| JP | A-2005-223820 | 8/2005 |
| JP | A-2007-60337 | 3/2007 |
| JP | A-2007-82052 | 3/2007 |
| JP | A-2007-104521 | 4/2007 |
| JP | A-2007-228472 | 9/2007 |

* cited by examiner (a) BOTH SURFACE ELECTRODE EVAPORATION FILM (b) ELECTRODE LAYER SANDWICHED BETWEEN INSULATION POLYMETRIC FILMS (c) TWO SHEETS OF ONE-SIDE ELECTRODE FILM AFFIXED WITH ELECTRODE FACES CONTACTING EACH OTHER

| FILM OSCILLATION PRIMARY RESONANCE FREQUENCY kHz | CARRIER WAVELENGTH mm | ACOUSTIC PIPE LENGTH mm |
|---|---|---|
| 30 | 11.33 | 2.83 |
| 40 | 8.50 | 2.13 |
| 50 | 6.80 | 1.70 |
| 60 | 5.67 | 1.42 |
| 70 | 4.86 | 1.21 |
| 80 | 4.25 | 1.06 |

FREQUENCY CHARACTERISTICS

DRIVE CONTROL METHOD OF ELECTROSTATIC-TYPE ULTRASONIC TRANSDUCER, ELECTROSTATIC-TYPE ULTRASONIC TRANSDUCER, ULTRASONIC SPEAKER USING ELECTROSTATIC-TYPE ULTRASONIC TRANSDUCER, AUDIO SIGNAL REPRODUCING METHOD, SUPERDIRECTIONAL ACOUSTIC SYSTEM, AND DISPLAY

BACKGROUND OF THE INVENTION

1. Technical Field

The present invention relates to a drive control method of an electrostatic-type ultrasonic transducer which generates constant high sound pressure in a wide frequency band range, the electrostatic-type ultrasonic transducer, an ultrasonic speaker using the electrostatic-type ultrasonic transducer, an audio signal reproducing method, a superdirectional acoustic system, and a display.

Priorities of Japanese Patent Application No. 2005-353275 filed on Dec. 7, 2005 and Japanese Patent Application No. 2006-307860 filed on Nov. 14, 2006 are claimed, and the entire disclosures of these are incorporated by reference herein.

2. Background Art

Currently, most of ultrasonic transducers are of resonance-type using piezoelectric ceramics.

A structure of a related-art ultrasonic transducer is shown in FIG. 15. Most of ultrasonic transducers currently used are of resonance-type using piezoelectric ceramics as oscillation elements. The ultrasonic transducer shown in FIG. 15 converts electric signals into ultrasonic waves and converts ultrasonic waves into electric signals (transmission and reception of ultrasonic waves) using piezoelectric ceramics as oscillation elements. A bimorph-type ultrasonic transducer shown in FIG. 15 has two piezoelectric ceramics 61 and 62, a cone 63, a case 64, leads 65, 66, and a screen 67.

The piezoelectric ceramics 61 and 62 are affixed to each other, and the lead 65 is connected with one of the surfaces opposite to the affixed surfaces of the piezoelectric ceramics 61 and 62, and the lead 66 is connected with the other surface.

Since the resonance-type ultrasonic transducer uses resonance phenomena of the piezoelectric ceramics, the characteristics of ultrasonic waves in transmission and reception are excellent in a relatively narrow frequency band range around the resonance frequency.

Different from the resonance-type ultrasonic transducer shown in FIG. 15, an electrostatic-type ultrasonic transducer is known as a wideband-type ultrasonic transducer which can generate high sound pressure over a high frequency band range. The electrostatic-type ultrasonic transducer is called a pull-type transducer since its oscillation film acts only in a direction to be attracted toward a fixed electrode. A specific structure of the wideband-type ultrasonic transducer (pull-type) is shown in FIG. 16. The electrostatic-type ultrasonic transducer shown in FIG. 16 uses a dielectric 131 (insulator) such as PET (polyethylene terephthalate resin) having a thickness of about 3 to 10 μm as an oscillator. An upper electrode 132 as a metal leaf made of aluminum or other materials is formed on the upper surface of the dielectric 131 as one piece by evaporation or other methods, and a lower electrode 133 made of brass is formed on the lower surface of the dielectric 131 in contact with each other. The lower electrode 133, with which a lead 152 is connected, is fixed to a base plate 135 made of bakelite or other materials.

A lead 153 is connected with the upper electrode 132 and a DC bias power supply 150. The DC bias power supply 150 constantly applies DC bias voltage of about 50 to 150 V to the upper electrode 132 to attract the upper electrode 132 toward the lower electrode 133. A signal supply 151 is equipped.

The dielectric 131, the upper electrode 132 and the base plate 135 are caulked by a case 130 with metal rings 136, 137 and 138, and a mesh 139.

A plurality of small grooves having non-uniform shapes and sizes of several tens to hundreds micrometers are formed on the surface of the lower electrode 133 facing the dielectric 131. Since the small grooves produce clearances between the lower electrode 133 and the dielectric 131, capacitance distribution between the upper electrode 132 and the lower electrode 133 varies with small fluctuations. These random small grooves are formed by roughing the surface of the lower electrode 133 by hand using a file. Since a number of capacitances with clearances having different sizes and depths are formed on the electrostatic system ultrasonic transducer, the ultrasonic transducer shown in FIG. 16 exhibits wideband frequency characteristics as indicated by a curve Q1 shown in FIG. 17.

According to the ultrasonic transducer having this structure, rectangular-wave signals (50 to 150 V p-p) are applied between the upper electrode 132 and the lower electrode 133 while DC bias voltage being applied to the upper electrode 132. The resonance-type ultrasonic transducer has frequency characteristics indicated by a curve Q2 in FIG. 17 having a center frequency (resonance frequency of piezoelectric ceramic) of 40 kHz, for example. Thus, the maximum sound pressure minus 30 dB is generated in the range of ±5 kHz from the center frequency where the maximum sound pressure is generated.

On the other hand, the frequency characteristics of the wideband-type ultrasonic transducer having the above structure are flat from about 40 kHz to about 100 kHz, and ±6 dB from the maximum sound pressure is generated at 100 kHz (see Patent References 1 and 2).

[Patent Reference 1] JP-A-2000-50387

[Patent Reference 2] JP-A-2000-50392

As discussed above, the electrostatic system ultrasonic transducer shown in FIG. 16 is known as a wideband ultrasonic transducer (pull type) which can generate relatively high sound pressure in a wide frequency band, different from the resonance-type ultrasonic transducer shown in FIG. 15. As shown in FIG. 13, the maximum sound pressure of the resonance-type ultrasonic transducer is 130 dB or larger. However, the maximum sound pressure of the electrostatic-type ultrasonic transducer generates sound pressure of only 120 dB or lower, which is slightly insufficient when the transducer is used for an ultrasonic speaker.

The details of an ultrasonic speaker are herein explained. Amplitudes of signals in an ultrasonic frequency band range called carrier waves are modulated by audio signals (signals in audio frequency band), and the ultrasonic transducer is operated based on the modulation signals. Then, sound waves produced from ultrasonic waves modulated by the audio signals of the signal supply are released in the air, and the original audio signals are self-reproduced in the air by non-linearity of the air.

Since sound waves are condensational and rarefactional waves which transmit in the air as transmission medium, the difference between the condensational part and the rarefactional part of the air becomes prominent during transmission of the modulated ultrasonic waves. That is, the speed of sound is high in the condensational part, and the speed of sound is low in the rarefactional part. Thus, distortion of the modulated waves is caused, resulting in waveform separation of the modulated waves into carrier waves (ultrasonic waves) and audio waves (original audio signals). In this case, humans can hear only audio sounds (original audio signals) at frequencies lower than 20 kHz. This principle is generally called parametric array effect.

For utilizing sufficient parametric array effect, the ultrasonic wave sound pressure needs to be at least 120 dB. However, it is difficult for the electrostatic-type ultrasonic transducer to achieve this level, and thus a ceramic piezoelectric device such as PZT or a polymeric piezoelectric device such as PVDF is often used as an ultrasonic wave generator.

However, a piezoelectric device has a sharp resonance point regardless of its material, and is actuated at the corresponding resonance frequency for practical use as an ultrasonic speaker. Thus, the frequency range where high sound pressure is securely generated is extremely narrow. That is, the piezoelectric device has a narrow band.

Generally, the maximum audio frequency band for humans is considered in the range from 20 Hz to 20 kHz, and thus humans have approximately 20 kHz band range. It is therefore possible to accurately demodulate original audio signals only when high sound pressure is secured over the frequency band range of 20 kHz in the ultrasonic wave range. It is easily understood that accurate reproduction (demodulation) in the wide range of 20 kHz is absolutely impossible when the conventional resonance-type ultrasonic speaker having the piezoelectric device is used.

Actually, the ultrasonic speaker using the conventional resonance-type ultrasonic transducer has the following problems: (1) narrow band and poor reproduction sound quality; (2) the allowable modulation factor is only about 0.5 or lower since demodulated sounds are distorted at an excessively high AM factor; (3) oscillation of the piezoelectric device becomes unstable and sounds are split when input voltage (volume) is increased, and the piezoelectric device itself tends to be broken when voltage is further increased; and (4) arraying, size-increasing and size-reducing are difficult, which leads to higher cost. The ultrasonic speaker using the electrostatic-type ultrasonic transducer (pull type) shown in FIG. 16 can solve almost all the problems arising from the above related art. However, absolute sound pressure required for sufficient sound volumes of demodulated sounds is short even though the band is widely covered.

Additionally, according to the pull-type ultrasonic transducer, electrostatic force acts only in the direction of attraction toward a fixed electrode, and the oscillation symmetry of an oscillation film (corresponding to upper electrode 132 in FIG. 16) is not maintained. Thus, in case that the pull-type transducer is used in the ultrasonic speaker, there is a problem that oscillations from the oscillation film directly generate audio sounds.

In order to overcome these drawbacks, the inventors of the invention have already proposed an ultrasonic transducer which can generate acoustic signals at a sufficiently high sound pressure level for obtaining parametric array effect in a wide frequency band range. According to this ultrasonic transducer, an oscillation film having a conductive layer is sandwiched by a pair of fixed electrodes having through holes at opposed positions, and AC signals are applied to a pair of the fixed electrodes while DC bias voltage being applied to the oscillation film.

This ultrasonic transducer is called push-pull-type ultrasonic transducer. According to this transducer, the oscillation film sandwiched between a pair of the fixed electrodes simultaneously receives electrostatic attraction force and electrostatic repulsive force in the same direction in accordance with the polarity direction of the AC signals. Thus, the oscillations of the oscillation film can be increased to a sufficient level for obtaining the parametric array effect. Moreover, since the oscillation symmetry is secure, higher sound pressure than that of the conventional pull-type ultrasonic transducer can be generated over a wide frequency band range.

However, it is difficult for the push-pull-type ultrasonic transducer to generate sufficient sound pressure in the air since the through holes through which sounds are released have relatively small areas.

Therefore, improved techniques for generating sufficient sound pressure are also required for the push-pull-type ultrasonic transducer having the above structure.

In addition, additional values of the ultrasonic transducer can be offered if the ultrasonic transducer generates high sound pressure over a wide band range.

SUMMARY OF THE INVENTION

The invention has been developed so solve the above problems. It is an object of the invention to provide a push-pull-type electrostatic-type ultrasonic transducer which generates more intensive ultrasonic waves under the same operation condition so that conversion efficiency between electric and acoustic energies can be improved.

In order to achieve the above object, a drive control method of an electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The drive control method of the electrostatic-type ultrasonic transducer is characterized in that modulation waves produced by modulating carrier waves in an ultrasonic frequency band by signal waves in an audio frequency band are applied between a pair of the electrodes, and that the through holes function as resonance pipes.

According to the drive control method of the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, operation of the electrostatic-type ultrasonic transducer is controlled such that the through holes formed on a pair of the electrodes can function as resonance pipes. Thus, intensive ultrasonic waves can be generated over a wide frequency band range, and the conversion efficiency between electric and acoustic energies can be improved. Furthermore, a drive control method of an electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The control method of the electrostatic-type ultrasonic transducer is characterized in that modulation waves produced by modulating carrier waves in an ultrasonic frequency band by signal waves in an audio frequency band are applied between a pair of the electrodes, and that the mechanical oscillation resonance frequency of the oscillation film agrees or substantially agrees with the acoustic resonance frequency of the through holes.

According to the drive control method of the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, operation of the electrostatic-type ultrasonic transducer is controlled such that the through holes formed on a pair of the electrodes can function as resonance pipes, and that the mechanical oscillation resonance frequency of the oscillation film agrees with the acoustic resonance frequency of the through holes. Thus, intensive ultrasonic waves can be generated over a wide frequency band range, and the conversion efficiency between electric and acoustic energies can be improved.

An electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The electrostatic-type ultrasonic transducer is characterized in that modulation waves produced by modulating carrier waves in an ultrasonic frequency band by signal waves in an audio frequency band are applied between a pair of the electrodes, and that the through holes function as resonance pipes.

According to the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, operation of the electrostatic-type ultrasonic transducer is controlled such that the through holes formed on a pair of the electrodes can function as resonance pipes. Thus, intensive ultrasonic waves can be generated over a wide frequency band range, and the conversion efficiency between electric and acoustic energies can be improved.

An electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The electrostatic-type ultrasonic transducer is characterized in that, when a wavelength obtained from a resonance frequency at a mechanical oscillation resonance point of the oscillation film is λ, a thickness t of the respective electrodes is $(\lambda/4)$ n or substantially $(\lambda/4)\cdot n$ (where λ: wavelength of ultrasonic wave, n: positive odd number). Also, the electrostatic-type ultrasonic transducer is characterized in that modulation waves produced by modulating carrier waves in an ultrasonic frequency band by signal waves in an audio frequency band are applied between a pair of the electrodes.

According to the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide Moreover, when the wavelength calculated from the resonance frequency as the mechanical oscillation resonance point of the oscillation film in the electrostatic-type ultrasonic transducer is λ, the thickness t of a pair of the electrodes is determined as $(\lambda/4)\cdot n$ or substantially $(\lambda/4)\cdot n$ (where λ: wavelength of ultrasonic wave, n: positive odd number). Thus, the mechanical oscillation resonance frequency of the oscillation film agrees with the acoustic resonance frequency of the through holes, and the parts corresponding to the thickness of the through holes of the respective electrodes constitute resonance pipes. Accordingly, sound pressure becomes the maximum in the vicinity of the outlets of the electrodes, and more intensive ultrasonic waves can be generated under the same operation conditions in the push-pull-type ultrasonic transducer. That is, the conversion efficiency between electric and acoustic energies can be improved in the push-pull-type ultrasonic transducer.

An electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The electrostatic-type ultrasonic transducer is characterized in that, when a wavelength obtained from a resonance frequency at a mechanical oscillation resonance point of the oscillation film is λ, a thickness t of the respective fixed electrodes lies in the range of $(\lambda/4)\cdot n-\lambda/8 \leq t \leq (\lambda/4)\cdot n+\lambda/8$ (where λ: wavelength of ultrasonic wave, n: positive odd number). Also, the electrostatic-type ultrasonic transducer is characterized in that modulation waves produced by modulating carrier waves in an ultrasonic frequency band by signal waves in an audio frequency band are applied between a pair of the electrodes.

According to the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, when the wavelength obtained from the resonance frequency at the mechanical oscillation resonance point of the oscillation film is λ, the thickness t of the respective electrodes lies in the range of $(\lambda/4)\cdot n-\lambda/8 \leq t \leq (\lambda/4)\cdot n+\lambda/8$ (where λ: wavelength of ultrasonic wave, n: positive odd number). Thus, the mechanical oscillation resonance frequency of the oscillation film agrees with the acoustic resonance frequency of the through holes, and the parts corresponding to the thickness of the through holes of the respective electrodes constitute resonance pipes. Accordingly, sound pressure becomes almost the maximum in the vicinity of the outlets of the electrodes, and more intensive ultrasonic waves can be generated under the same operation conditions in the push-pull-type ultrasonic transducer. That is, the conversion efficiency between electric and acoustic energies can be improved in the push-pull-type ultrasonic transducer.

An electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The electrostatic-type ultrasonic transducer is characterized in that, when a wavelength obtained from a resonance frequency at a mechanical oscillation resonance point of the oscillation film is λ, a thickness t1 of one of the respective electrodes is $(\lambda/4)\cdot n-\lambda/8 \leq t1 \leq (\lambda/4)\cdot n+\lambda/8$ (where λ: wavelength of ultrasonic wave, n: positive odd number) and a thickness t2 of the other electrode is $(\lambda/4)\cdot m-\lambda/8 \leq t2 \leq (\lambda/4)\cdot m+\lambda/8$ (where λ: wavelength of ultrasonic wave, m: positive even number). Also, the electrostatic-type ultrasonic transducer is characterized in that modulation waves produced by modulating carrier waves in an ultrasonic frequency band by signal waves in an audio frequency band are applied between a pair of the electrodes.

According to the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, when the wavelength obtained from the resonance frequency at the mechanical oscillation resonance point of the oscillation film is λ, the thickness t1 of one of the respective electrodes is $(\lambda/4)\cdot n-\lambda/8 \leq t1 \leq (\lambda/4)\cdot n+\lambda/8$ (where λ: wavelength of ultrasonic wave, n: positive odd number) and a thickness t2 of the other electrode is $(\lambda/4)\cdot m-\lambda/8 \leq t2 \leq (\lambda/4)\cdot m+\lambda/8$ (where λ: wavelength of ultrasonic wave, m: positive even number). Thus, the parts corresponding to the thickness of the through holes of one electrode (front face) from which sounds having high pressure are desired to be released constitute resonance pipes, and the mechanical oscillation resonance frequency of the oscillation film agrees with the acoustic resonance frequency of the through holes. Accordingly, sound pressure becomes the maximum in the vicinity of the outlets of the through holes of the electrodes. On the other hand, at the parts corresponding to the thickness of the through holes of the other electrode (back face) from which no sound release is required, sound pressure becomes the minimum in the vicinity of the outlets of the through holes of the electrodes. Therefore, more intensive ultrasonic waves can be generated from one electrode (front face side) in a wide frequency band range under the same operation conditions under the same operation conditions in the push-pull-type ultrasonic transducer. In addition, sound release from the other electrode (back face side) can be reduced. That is, the conversion efficiency between electric and acoustic energies can be improved in the push-pull-type ultrasonic transducer.

An electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. The electrostatic-type ultrasonic transducer is characterized in that, when a wavelength obtained from a resonance frequency at a mechanical oscillation resonance point of the oscillation film is λ, a thickness t1 of one of the respective electrodes is $(\lambda/4)\cdot n$ or substantially $(\lambda/4)\cdot n$ (where λ: wavelength of ultrasonic wave, n: positive odd number) and a thickness t2 of the other electrode is $(\lambda/4)\cdot m$ or substantially $(\lambda/4)\cdot m$ (where λ: wavelength of ultrasonic wave, m: positive even number, t2 is a value only in the range of the right side when m=0). Also, the electrostatic-type ultrasonic transducer is characterized in that modulation waves produced by modulating carrier waves in an ultrasonic frequency band by signal waves in an audio frequency band are applied between a pair of the electrodes.

According to the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, when the wavelength obtained from the resonance frequency at the mechanical oscillation resonance point of the oscillation film is λ, the thickness t1 of one of the respective electrodes is (λ/4)·n or substantially (λ/4)·n (where λ: wavelength of ultrasonic wave, n: positive odd number) and the thickness t2 of the other electrode is (λ/4)·m or substantially (λ/4)·m (where λ: wavelength of ultrasonic wave, m: positive even number, t2 is a value only in the range of the right side when m=0). Thus, the parts corresponding to the thickness of the through holes of one electrode (front face) from which sounds having high pressure are desired to be released constitute resonance pipes, and the mechanical oscillation resonance frequency of the oscillation film agrees with the acoustic resonance frequency of the through holes. Accordingly, sound pressure becomes the maximum in the vicinity of the outlets of the through holes of the electrodes. On the other hand, at the parts corresponding to the thickness of the through holes of the other electrode (back face) from which no sound release is required, sound pressure becomes the minimum in the vicinity of the outlets of the through holes of the electrodes.

Therefore, more intensive ultrasonic waves can be generated from one electrode (front face side) in a wide frequency band range under the same operation conditions in the push-pull-type ultrasonic transducer. In addition, sound release from the other electrode (back face side) can be reduced. That is, the conversion efficiency between electric and acoustic energies can be improved in the push-pull-type ultrasonic transducer.

An electrostatic-type ultrasonic transducer according to the invention is characterized in that the holes formed on a pair of the electrodes are cylindrical through holes.

According to the electrostatic-type ultrasonic transducer of the invention, ultrasonic waves generated by oscillation of the oscillation film are released through the cylindrical through holes on a pair of the electrodes. The cylindrical through holes can be manufactured most easily.

An electrostatic-type ultrasonic transducer according to the invention is characterized in that the holes formed on a pair of the electrodes are through holes each of which is constituted by at least two types of concentric and cylindrical holes having different sizes in diameter and depth. Each type of the holes is formed successively from the other hole type.

According to the electrostatic-type ultrasonic transducer of the invention having this structure, the holes formed on a pair of the electrodes are through holes each of which is constituted by at least two types of concentric and cylindrical holes having different sizes in diameter and depth. Each type of the holes is formed successively from the other hole type. In this case, the parts of the electrodes disposed in parallel with the edges of the respective concentric and cylindrical holes having two or more sizes are opposed to the conductive layer of the oscillation film. Thus, parallel capacitors are formed.

Since a pulling up force and a pushing down force are simultaneously applied to the parts of the oscillation film opposed to the edges of the respective holes, the oscillations of the oscillation film can be increased.

An electrostatic-type ultrasonic transducer according to the invention is characterized in that the holes formed on a pair of the electrodes are through holes each of which has a tapered cross section.

According to the electrostatic-type ultrasonic transducer of the invention having this structure, the through holes each of which has a tapered cross section are formed on a pair of the electrodes in this case, the tapered portions of the electrodes are opposed to the conductive layer of the oscillation film, and thus parallel capacitors are formed.

Since a pulling up force and a pushing down force are simultaneously applied to the parts of the oscillation film opposed to the tapered portions of the electrodes, the oscillations of the oscillation film can be increased.

An electrostatic-type ultrasonic transducer according to the invention is characterized in that the holes formed on a pair of the electrodes are through holes each of which has a rectangular cross section.

According to the electrostatic-type ultrasonic transducer of the invention having this structure, ultrasonic waves generated by oscillations of the oscillation film are released through the through holes having rectangular cross sections and formed on a pair of the electrodes. The through holes having rectangular cross sections can be manufactured most easily.

An electrostatic-type ultrasonic transducer according to the invention is characterized in that the holes formed on a pair of the electrodes are through holes each of which is constituted by at least two types of rectangular holes formed on the same center line and having the same length and different sizes in diameter and depth. Each type of the holes is formed successively from the other hole type.

According to the electrostatic-type ultrasonic transducer of the invention having this structure, the through holes each of which is constituted by at least two types of rectangular holes formed on the same center line and having the same length and different sizes in diameter and depth are formed on a pair of the electrodes. Each type of the holes is formed successively from the other hole type. In this case, the parts of a pair of the electrodes in parallel with the edges of the through holes each of which is constituted by at least two types of rectangular holes in size formed on the electrodes are opposed to the conductive layer of the oscillation film, and thus parallel capacitors are formed. Since a pulling up force and a pushing down force are simultaneously applied to the parts of the oscillation film opposed to the edges of the respective holes, the oscillations of the oscillation film can be increased.

An electrostatic-type ultrasonic transducer according to the invention is characterized in that the holes formed on a pair of the electrodes are rectangular through holes each of which has a rectangular shape in the plan view and a tapered shape in the cross-sectional view.

According to the electrostatic-type ultrasonic transducer of the invention having this structure, the through holes each of which has a rectangular shape in the plan view and a tapered shape in the cross-sectional view are formed on a pair of the electrodes. In this case, the tapered parts of the electrodes are opposed to the conductive layer of the oscillation film, and thus parallel capacitors are formed. Since a pulling up force and a pushing down force are simultaneously applied to the parts of the oscillation film opposed to the tapered parts of the electrodes, the oscillations of the oscillation film can be increased.

An electrostatic-type ultrasonic transducer according to the invention is characterized in that each of the holes formed on a pair of the electrodes has a larger diameter and a smaller depth on the oscillation film side than on the opposite side.

According to the electrostatic-type ultrasonic transducer of the invention having this structure, the holes each of which has a larger diameter and a smaller depth on the oscillation film side than on the opposite side are formed on a pair of the electrodes. In this case, the parts of the fixed electrodes in parallel with the edges of the respective concentric and cylindrical holes each of which is constituted by at least two types of rectangular holes in size are opposed to the conductive layer of the oscillation film, and thus parallel capacitors are formed. Accordingly, electrostatic attractive force and electrostatic repulsive force acting on the conductive layer of the oscillation film can be increased.

An electrostatic-type ultrasonic transducer according to the invention is characterized in that each of the rectangular holes formed on a pair of the electrodes has a larger width and a smaller depth on the oscillation film side than on the opposite side.

According to the electrostatic-type ultrasonic transducer of the invention having this structure, the rectangular holes each of which has a larger width and a smaller depth on the oscillation film side than on the opposite side are formed on a pair of the electrodes. In this case, the parts of the fixed electrodes in parallel with the edges of the respective rectangular holes each of which is constituted by at least two types of holes in size, or the tapered parts of the fixed electrodes are opposed to the conductive layer of the oscillation film, and thus parallel capacitors are formed. Accordingly, electrostatic attractive force and electrostatic repulsive force acting on the conductive layer of the oscillation film can be increased.

An electrostatic-type ultrasonic transducer according to the invention is characterized in that the plural through holes have the same size.

According to the electrostatic-type ultrasonic transducer of the invention having this structure, the plural through holes having the same size are formed on a pair of the electrodes. Thus, the holes can be easily formed and the manufacture cost can be reduced.

An electrostatic-type ultrasonic transducer according to the invention is characterized in that the plural through holes have a plurality of hole sizes and the through holes at opposed positions have the same hole size.

According to the electrostatic-type ultrasonic transducer of the invention having this structure, the plural through holes which have a plurality of hole sizes and those of which at opposed positions have the same hole size are formed on a pair of the electrodes. Thus, the holes can be easily formed and the manufacture cost can be reduced.

An electrostatic-type ultrasonic transducer according to the invention is characterized in that a pair of the electrodes are constituted by a single conductive material.

According to the electrostatic-type ultrasonic transducer of the invention having this structure, a pair of the electrodes are constituted by a single conductive material such as SUS, brass, iron, and nickel.

An electrostatic-type ultrasonic transducer according to the invention is characterized in that a pair of the electrodes are constituted by a plurality of conductive materials.

According to the electrostatic-type ultrasonic transducer of the invention having this structure, a pair of the electrodes can be formed by a plurality of conductive materials.

An electrostatic-type ultrasonic transducer according to the invention is characterized in that a pair of the electrodes are constituted by both conductive and insulation materials.

According to the electrostatic-type ultrasonic transducer of the invention having this structure, a pair of the electrodes are constituted by both conductive and insulation materials. For example, the fixed electrodes constituted by conductive and insulation materials can be formed by plating an insulation material such as a glass epoxy substrate or a paper phenol substrate with nickel, gold, silver, copper or other materials after desired holes are formed on the insulation material. In this case, the weight of the ultrasonic transducer can be reduced.

An electrostatic-type ultrasonic transducer according to the invention is characterized in that the oscillation film is a thin film having an insulation polymeric film and electrode layers on both surfaces of the polymeric film.

According to the electrostatic-type ultrasonic transducer of the invention having this structure, the oscillation film has the electrode layers on both surfaces of the polymeric film. In this case, an insulation layer is formed on each of the electrodes on the side opposed to the oscillation film as will be described later. Thus, the oscillation film can be easily manufactured.

An electrostatic-type ultrasonic transducer according to the invention is characterized in that the oscillation film is a thin film having the electrode layers sandwiched between two insulation polymeric films.

According to the electrostatic-type ultrasonic transducer of the invention having this structure, the oscillation film is constituted by the electrode layers sandwiched between two insulation polymeric films. Since no insulation treatment is required for the electrodes, the ultrasonic transducer can be easily manufactured. In addition, positional symmetry of the electrodes with respect to the oscillation film is easily secured.

An electrostatic-type ultrasonic transducer according to the invention is characterized in that the oscillation film is formed by tightly attaching two electrode layers each of which is provided on a thin film formed on one side of the insulation polymeric film.

According to the electrostatic-type ultrasonic transducer of the invention having this structure, the oscillation film is formed by tightly attaching two electrode layers each of which is provided on a thin film formed on one side of the insulation polymeric film. Thus, the oscillation film can be easily manufactured.

An electrostatic-type ultrasonic transducer according to the invention is characterized in that the oscillation film is constituted by an electret film.

According to the electrostatic-type ultrasonic transducer of the invention having this structure, the oscillation film is constituted by an electret film. In this case, an insulation layer is formed on the electrode side. Thus, the oscillation film can be easily manufactured.

An electrostatic-type ultrasonic transducer according to the invention is characterized in that electrically insulating treatment is applied to the respective oscillation film sides of a pair of the electrodes when the oscillation film as a thin film having an insulation polymeric film and electrode layers on both surfaces of the insulation polymeric film or as an electret film is used.

According to the electrostatic-type ultrasonic transducer of the invention having this structure, electrically insulating treatment is applied to the oscillation film sides of a pair of the electrodes when the oscillation film as a thin film having an insulation layer (insulation film) and conductive layers (electrode layers) on both surfaces of the insulation layer or as an electret film is used. Thus, a double-side electrode evaporation film having conductive layers (electrode layers) on both surfaces of an insulation layer (insulation film) or an electret film can be used as the oscillation film.

An electrostatic-type ultrasonic transducer according to the invention is characterized in that DC bias voltage having single polarity is applied to the oscillation film.

According to the electrostatic-type ultrasonic transducer of the invention having this structure, DC bias voltage having single polarity is applied to the oscillation film. Since charges having the same polarity are constantly accumulated on the electrode layers of the oscillation film, the oscillation film receives electrostatic attractive force and electrostatic repulsive force in accordance with the polarity of the voltage of the electrodes which is variable by AC signals applied to a pair of the electrodes. As a result, the oscillation film is oscillated by these forces.

An electrostatic-type ultrasonic transducer according to the invention is characterized in that a member for supporting the electrodes and the oscillation film is constituted by an insulation material.

According to the electrostatic-type ultrasonic transducer of the invention having this structure, the member for supporting the electrodes and the oscillation film is constituted by an insulation material. Thus, insulation of electricity between the electrodes and the oscillation film can be maintained.

An electrostatic-type ultrasonic transducer according to the invention is characterized in that the oscillation film is fixed by applying tension on the film surface in the right-angled four directions.

According to the electrostatic-type ultrasonic transducer of the invention having this structure, the oscillation film is fixed by applying tension on the film surface in the right-angled four directions. According to a conventional technique, DC bias voltage of several hundreds volts needs to be applied to the oscillation film so as to attract the oscillation film toward the electrode side. However, this DC bias voltage can be reduced when the oscillation film is fixed by applying tension to the film at the time of manufacture of the film unit, by the reason that the same effect as that of the pulling tension produced by that level of DC bias voltage can be offered.

An electrostatic-type ultrasonic transducer according to the invention includes: a first electrode having through holes; a second electrode having through holes; and an oscillation film which is disposed such that each of the through holes of the first electrode is paired with the corresponding through hole of the second electrode, is sandwiched between a pair of the first and second electrodes, and has a conductive layer to which direct current bias voltage is applied. When a wavelength obtained from a resonance frequency at a mechanical oscillation resonance point of the oscillation film is λ, a thickness t of the respective fixed electrodes is (λ/4)·n or substantially (λ/4)·n (where λ: wavelength of ultrasonic wave, n: positive odd number). Modulation waves produced by modulating carrier waves in an ultrasonic frequency band by signal waves in an audio frequency band are applied between a pair of the electrodes. The electrostatic-type ultrasonic transducer is characterized in that an acoustic reflection plate for reflecting ultrasonic waves released from the respective openings of a back face of the electrostatic-type ultrasonic transducer to a front face of the electrostatic-type ultrasonic transducer by routes all having the same length is provided on the back face of the electrostatic-type ultrasonic transducer.

In an electrostatic-type ultrasonic transducer according to the invention, the acoustic reflection plate has a pair of first reflection plates and a pair of second reflection plates, one end of each of the first reflection plates being positioned at a center position of the back face of the ultrasonic transducer and extending from the center position as a reference position forming an angle of 45 degrees with respect to the back face of the ultrasonic transducer toward both sides such that the other end of the first reflection plate corresponds to the end of the ultrasonic transducer, and each of the second reflection plates connected to the corresponding end of the first reflection plate extending outward forming right angles such that the second reflection plates have the same length as that of the first reflection plates.

According to the electrostatic-type ultrasonic transducer of the invention having this structure, the first and the second electrodes have the through holes at the opposed positions, and AC signals as drive signals are applied to a pair of the first and second electrodes while DC bias voltage being applied to the conductive layer of the oscillation film. As a result, the oscillation film sandwiched between the two electrodes simultaneously receives electrostatic attraction force and electrostatic repulsive force in the same direction in accordance with the direction of the polarity of the AC signals. Thus, the oscillations of the oscillation film can be increased to a level sufficient for obtaining parametric effect, and also the symmetry of the oscillations can be secured. Accordingly, high sound pressure can be generated in a wide frequency band range.

Moreover, when the wavelength calculated from the resonance frequency as the mechanical oscillation resonance point of the oscillation film in the electrostatic-type ultrasonic transducer is λ, the thickness t of a pair of the electrodes is determined as (λ/4)·n or substantially (λ/4)·n (where λ: wavelength of ultrasonic wave, n: positive odd number). Thus, the mechanical oscillation resonance frequency of the oscillation film agrees with the acoustic resonance frequency of the through holes, and the parts corresponding to the thickness of the through holes of the respective electrodes constitute resonance pipes. Accordingly, sound pressure becomes the maximum in the vicinity of the outlets of the electrodes, and more intensive ultrasonic waves can be generated under the same operation conditions in the push-pull-type ultrasonic transducer. That is, the conversion efficiency between electric and acoustic energies can be improved in the push-pull-type ultrasonic transducer.

Furthermore, the acoustic reflection plate for reflecting ultrasonic waves released from the respective openings of the back face of the electrostatic-type ultrasonic transducer to the front face of the electrostatic-type ultrasonic transducer by routes all having the same length is provided on the back face of the electrostatic-type ultrasonic transducer. More specifically, the acoustic reflection plate provided on the back face of the electrostatic-type ultrasonic transducer has a pair of first reflection plates and a pair of second reflection plates, one end of each of the first reflection plates being positioned at the center position of the back face of the ultrasonic transducer and extending from the center position as a reference position forming an angle of 45 degrees with respect to the back face of the ultrasonic transducer toward both sides such that the other end of the first reflection plate corresponds to the end of the ultrasonic transducer, and each of the second reflection plates connected to the corresponding end of the first reflection plate extending outward forming right angles such that the second reflection plates have the same length as that of the first reflection plates. Since ultrasonic waves released from the back face of the electrostatic-type ultrasonic transducer are reflected by the acoustic reflection plate toward the front face, ultrasonic waves released from both the front face and back face of the electrostatic-type ultrasonic transducer can be effectively utilized.

An ultrasonic speaker according to the invention includes an electrostatic-type ultrasonic transducer which contains a first electrode having through holes, a second electrode having through holes, and an oscillation film which is disposed such that each of the through holes of the first electrode is paired with the corresponding through hole of the second electrode, is sandwiched between a pair of the first and second electrodes, and has a conductive layer to which direct current bias voltage is supplied. In the electrostatic-type ultrasonic transducer, when a wavelength obtained from a resonance frequency at a mechanical oscillation resonance point of the oscillation film is λ, a thickness t of the respective fixed electrodes is (λ/4)·n or substantially (λ/4)·n (where λ: wavelength of ultrasonic wave, n: positive odd number). Also, modulation waves produced by modulating carrier waves in an ultrasonic frequency band by signal waves in an audio frequency band are applied between a pair of the electrodes. The ultrasonic speaker also includes a signal source for producing signal waves in an audio frequency band, carrier wave supply means for producing and outputting carrier waves in an ultrasonic frequency band, and modulating means for modulating the carrier waves by the signal waves in the audio frequency band outputted from the signal source. The ultrasonic speaker is characterized in that the electrostatic-type ultrasonic transducer is actuated by modulation signals outputted from the modulating means and applied between the electrode layer of the oscillation film and a pair of the electrodes.

According to the ultrasonic speaker of the invention having this structure, signal waves in an audio frequency band are generated from the signal source, and carrier waves in an ultrasonic frequency band are generated and outputted from the carrier wave supply means. Then, the carrier waves are modulated by the signal waves in the audio frequency band outputted from the signal source by using the modulating means, and modulation signals outputted from the modulating means are applied between the fixed electrodes and the electrode layer of the oscillation film for operation.

The ultrasonic speaker of the invention uses the electrostatic-type ultrasonic transducer having the above structure. Thus, the ultrasonic speaker can generate acoustic signals at a sound pressure level sufficient for obtaining parametric effect in a wide frequency band range.

Moreover, the ultrasonic speaker of the invention uses the electrostatic-type ultrasonic transducer so designed that the mechanical oscillation resonance frequency of the oscillation film agrees with the acoustic resonance frequency of the through holes. Thus, the ultrasonic speaker of the invention can generate intensive ultrasonic waves in a wide frequency band range with improved sound quality.

An audio signal reproducing method according to the invention uses an electrostatic-type ultrasonic transducer which includes a first electrode having through holes, a second electrode having through holes, and an oscillation film which is disposed such that each of the through holes of the first electrode is paired with the corresponding through hole of the second electrode, is sandwiched between a pair of the first and second electrodes, and has a conductive layer to which direct current bias voltage is applied. In the electrostatic-type ultrasonic transducer, when a wavelength obtained from a resonance frequency at a mechanical oscillation resonance point of the oscillation film is λ, a thickness t of the respective fixed electrodes is (λ/4)·n or substantially (λ/4)·n (where λ: wavelength of ultrasonic wave, n: positive odd number). Also, modulation waves produced by modulating carrier waves in an ultrasonic frequency band by signal waves in an audio frequency band are applied between a pair of the electrodes. The audio signal reproducing method is characterized by including a step for producing signal waves in an audio frequency band by a signal source, a step for producing and outputting carrier waves in an ultrasonic frequency band by carrier wave supply means, a step for modulating the carrier waves by the signal waves in the audio frequency band outputted from the signal source for producing modulation signals by modulating means, and a step for actuating the electrostatic-type ultrasonic transducer by the modulation signals outputted from the modulating means and applied between the electrodes and the electrode layer of the oscillation film.

According to the audio signal reproducing method for an electrostatic-type ultrasonic transducer of the invention containing these steps, signal waves in an audio frequency band are generated from the signal source, and carrier waves in an ultrasonic frequency band are generated and outputted from the carrier wave supply means. Then, the carrier waves are modulated by the signal waves in the audio frequency band outputted from the signal source by using the modulating means, and modulation signals outputted from the modulating means are applied between the fixed electrodes and the electrode layer of the oscillation film for operation.

Thus, by using the electrostatic-type ultrasonic transducer having the above structure, the film oscillations can be increased with low voltage applied between the electrodes. Also, acoustic signals at a sound pressure level sufficiently high for obtaining parametric effect in a wide frequency band range can be outputted, and thus audio signals can be reproduced.

Moreover, the audio signal reproducing method for an electrostatic-type ultrasonic transducer of the invention uses the electrostatic-type ultrasonic transducer so designed that the mechanical oscillation resonance frequency of the oscillation film agrees with the acoustic resonance frequency of the through holes. Thus, intensive ultrasonic waves can be generated in a wide frequency band range with improved sound quality of reproduced sounds.

A superdirectional acoustic system according to the invention includes an ultrasonic speaker having an electrostatic-type ultrasonic transducer which contains a first electrode having through holes, a second electrode having through holes, and an oscillation film which is disposed such that each of the through holes of the first electrode is paired with the corresponding through hole of the second electrode, is sandwiched between a pair of the first and second electrodes, and has a conductive layer to which direct current bias voltage is applied. In the electrostatic-type ultrasonic transducer, when a wavelength obtained from a resonance frequency at a mechanical oscillation resonance point of the oscillation film is λ, a thickness t of the respective fixed electrodes is (λ/4)·n or substantially (λ/4)·n (where λ: wavelength of ultrasonic wave, n: positive odd number). Also, modulation waves produced by modulating carrier waves in an ultrasonic frequency band by signal waves in an audio frequency band are applied between a pair of the electrodes. The ultrasonic speaker reproduces audio signals in middle-tone and high-tone ranges in audio signals supplied from an acoustic source. The superdirectional acoustic system also includes a low-tone reproduction speaker for reproducing audio signals in low-tone range in audio signals supplied from the acoustic source are provided. The superdirectional acoustic system is characterized in that the ultrasonic speaker reproduces audio signals supplied from the acoustic source to form a virtual sound source in the vicinity of a sound wave, reflection plane such as a screen.

The superdirectional acoustic system according to the invention having this structure uses the ultrasonic speaker which includes the electrostatic-type ultrasonic transducer constituted by the first electrode having through holes, the second electrode having through holes, and the oscillation film which is disposed such that each of the through holes of the first electrode is paired with the corresponding through hole of the second electrode, is sandwiched between a pair of the first and second electrodes, and has the conductive layer to which direct current bias voltage is applied. The ultrasonic speaker reproduces audio signals in middle-tone and high-tone ranges in audio signals supplied from the acoustic source. Also, the low-tone reproduction speaker reproduces audio signals in low-tone range in audio signals supplied from the audio source.

Thus, acoustic sounds in middle-tone and high-tone ranges can be reproduced with sufficient sound pressure and wide range characteristics from a virtual sound source formed in the vicinity of the sound wave reflection plane such as a screen with reduced voltage applied between the electrodes of the electrostatic-type ultrasonic transducer under the condition of improved sound pressure characteristics. Since acoustic sounds in low-tone range are directly outputted from the low-tone reproduction speaker equipped in the acoustic system, sounds in low-tone range can be intensified and a preferable environment which offers the feeling of being at a live performance can be produced.

Moreover, the superdirectional acoustic system according to the invention uses the electrostatic-type ultrasonic transducer so designed that the mechanical oscillation resonance frequency of the oscillation film agrees with the acoustic resonance frequency of the through holes. Thus, intensive ultrasonic waves can be generated in a wide frequency band range with improved sound quality of reproduced sounds.

A display according to the invention includes an ultrasonic speaker having an electrostatic-type ultrasonic transducer which contains a first electrode having through holes, a second electrode having through holes, and an oscillation film which is disposed such that each of the through holes of the first electrode is paired with the corresponding through hole of the second electrode, is sandwiched between a pair of the first and second electrodes, and has a conductive layer to which direct current bias voltage is applied. In the electrostatic-type ultrasonic transducer, when a wavelength obtained from a resonance frequency at a mechanical oscillation resonance point of the oscillation film is λ, a thickness t of the respective fixed electrodes is (λ/4)·n or substantially (λ/4)·n (where λ: wavelength of ultrasonic wave, n: positive odd number). Also, modulation wave AC signals produced by modulating carrier waves in an ultrasonic frequency band by signal waves in an audio frequency band are applied between a pair of the electrodes. The ultrasonic speaker reproduces signal sounds in an audio frequency band from audio signals supplied from an acoustic source. The display also includes a projection optical system for projecting images on a projection plane.

The display according to the invention having this structure uses the ultrasonic speaker which includes the electrostatic-type ultrasonic speaker constituted by the first electrode having through holes, the second electrode having through holes, and the oscillation film which is disposed such that each of the through holes of the first electrode is paired with the corresponding through hole of the second electrode, is sandwiched between a pair of the first and second electrodes, and has the conductive layer to which direct current bias voltage is applied. When the wavelength obtained from the resonance frequency at the mechanical oscillation resonance point of the oscillation film is λ, the thickness t of the respective fixed electrodes is (λ/4)·n or substantially (λ/4)·n (where λ: wavelength of ultrasonic wave, n: positive odd number). Also, AC signals as modulation waves produced by modulating carrier waves in an ultrasonic frequency band by signal waves in an audio frequency band are applied between a pair of the electrodes. The supersonic speaker reproduces audio signals supplied from the acoustic source.

In this case, acoustic signals can be reproduced with sufficient sound pressure and wide range characteristics from a virtual sound source formed in the vicinity of the sound wave reflection plane such as a screen under the condition of improved sound pressure characteristics. Thus, the reproduction range of acoustic signals can be easily controlled, and the directionality of sounds released from the ultrasonic speaker can be controlled.

Moreover, the superdirectional acoustic system according to the invention uses the electrostatic-type ultrasonic transducer so designed that the mechanical oscillation resonance frequency of the oscillation film agrees with the acoustic resonance frequency of the through holes. Thus, intensive ultrasonic waves can be generated in a wide frequency band range with improved sound quality of reproduced sounds.

BRIEF DESCRIPTION OF THE DRAWINGS

[FIG. 1]

FIG. 5 is a plan view illustrating a structure of the fixed electrode having through holes in the ultrasonic transducer in the embodiment according to the invention.

[FIG. 7]

FIG. 8 shows specific examples of relations among primary resonance frequency of mechanical oscillations of the oscillation film, wavelength λ of the carrier waves (ultrasonic frequency band), and acoustic pipe length.

FIG. 9 illustrates a structure of an ultrasonic transducer in another embodiment according to the invention.

FIG. 10 is a block diagram showing a structure of an ultrasonic speaker in the embodiment according to the invention.

FIG. 11 illustrates a use condition of a projector in the embodiment according to the invention.

[FIG. 12]

FIG. 13 is a block diagram showing an electric structure of the projector shown in FIG. 11.

FIG. 14 shows a reproduction condition of reproduction signals produced by the ultrasonic transducer.

FIG. 15 illustrates a structure of a resonance-type ultrasonic transducer in a related art.

FIG. 16 illustrates a specific structure of an electrostatic-type wideband ultrasonic transducer in a related art.

FIG. 17 shows frequency characteristics of the ultrasonic transducer in the embodiment according to the invention together with frequency characteristics of the ultrasonic transducer in the related art.

DESCRIPTION OF PREFERRED EMBODIMENTS

Figure 1A:
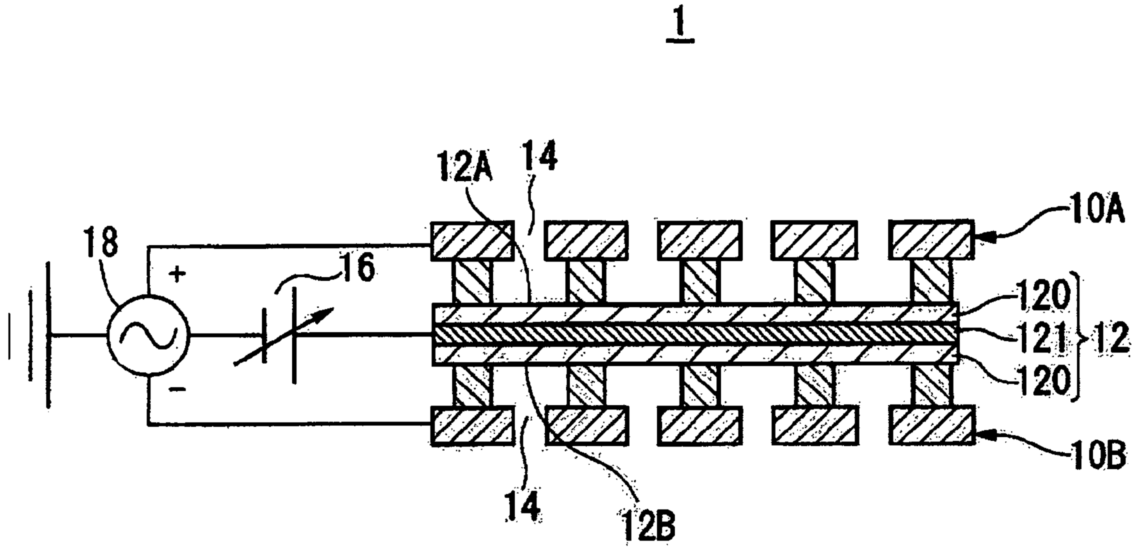
FIGS. 1(A) and 1(B) illustrate a structure of an ultrasonic transducer in an embodiment according to the invention.
Figure 1B:
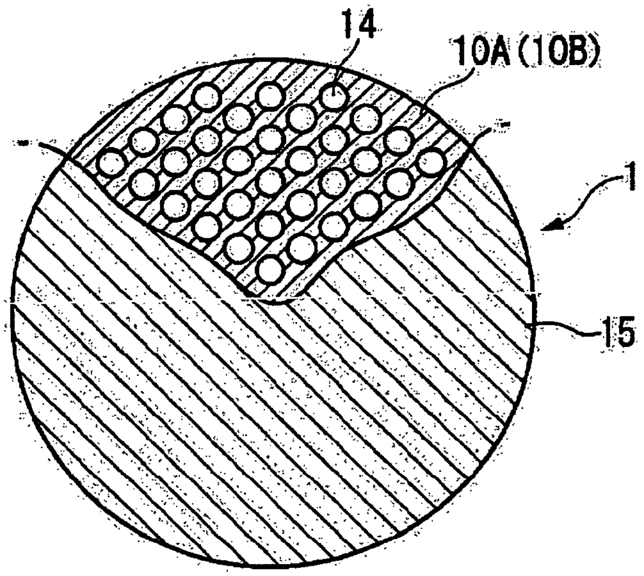

Several embodiments according to the invention are hereinafter described in detail with reference to the drawings. Several embodiments according to the invention are hereinafter described in detail with reference to the drawings. FIGS. 1(A) and 1(B) illustrate a structure of an electrostatic-type ultrasonic transducer in an embodiment according to the invention. FIG. 1(A) shows a structure of the electrostatic-type ultrasonic transducer, and FIG. 1(B) is a plan view of the electrostatic-type ultrasonic transducer a part of which is removed therefrom. As illustrated in FIGS. 1(A) and 1(B), an electrostatic-type ultrasonic transducer 1 in the embodiment according to the invention includes a pair of fixed electrodes 10A (first electrode) and 10B (second electrode) each of which contains a conductive component made of conductive material functioning as an electrode, an oscillation film 12 which is sandwiched between a pair of the fixed electrodes 10A and 10B and has a conductive layer 121, and a member (not shown) for holding a pair of the fixed electrodes 10A and 10B and the oscillation film.

The oscillation film 12 is formed by an insulator 120, and has the electrode layer 121 made of conductive material. DC bias voltage having single polarity (polarity may be either positive or negative) is applied to the electrode layer 121 by a DC bias power supply 16. Also, AC signals 18A and 18B mutually phase-inverted and outputted from a signal supply 18 are applied to the fixed electrodes 10A and 10B in such a manner as to be superimposed on the DC bias voltage and supplied between the electrode layer 121 and the electrodes 10A and 10B.

Each of the two fixed electrodes 10A and 10B has a plurality of and an equal number of through holes 14 each of which is opposed to the corresponding hole on the other electrode with the oscillation film 12 interposed therebetween. The AC signals 18A and 18B mutually phase-inverted are applied between the conductive members of a pair of the fixed electrodes 10A and 10B by the signal supply 18. Capacitors are provided between the fixed electrode 10A and the electrode layer 121 and between the fixed electrode 10B and the electrode layer 121.

As will be described later, the through holes formed on one of a pair of the fixed electrodes 10A and 10B and on both of the electrodes 10A and 10B have a predetermined thickness t as the thickness of the fixed electrode so as to function as resonance pipes. Moreover, the electrostatic-type ultrasonic transducer 1 is controlled such that the mechanical oscillation resonance frequency of the oscillation film 12 agrees with the acoustic resonance frequency of the through holes 14.

In the electrostatic ultrasonic transducer 1 having the above structure, the AC signals 18A and 18B mutually phase-inverted and outputted from the signal supply 18 are superimposed on the DC bias voltage having single polarity (positive polarity in this embodiment) and outputted by the DC bias power supply 16, and applied to the electrode layer of the oscillation film 12.

On the other hand, the AC signals 18A and 18B mutually phase-inverted and outputted from the signal supply 18 are applied to a pair of the fixed electrodes 10A and 10B.

As a result, positive voltage is applied to the fixed electrode 10A in the positive half cycle of the AC signal 18A outputted from the signal supply 18. Thus, electrostatic repelling force acts on surface parts 12A of the oscillation film 12 not sandwiched between the fixed electrodes, and the surface parts 12A are pulled downward in FIG. 1.

Simultaneously, the AC signal 18B is in the negative cycle, and negative voltage is applied to the opposed fixed electrode 10B. As a result, electrostatic attraction force acts on back surface parts 12B on the back side of the surface parts 12A of the oscillation film 12. Thus, the back surface parts 12B are pulled further downward in FIG. 1.

Thus, the film parts of the oscillation film 12 not sandwiched between a pair of the fixed electrodes 10A and 10B receive electrostatic repelling force and electrostatic repulsive force in the same direction. Similarly, in the negative half cycle of the AC signals outputted from the signal supply 18, electrostatic attraction force pulls the surface parts 12A of the oscillation film 12 upward in FIG. 1, and electrostatic repelling force pulls the back surface parts 12B upward in FIG. 1. The film parts of the oscillation film 12 not sandwiched between a pair of the fixed electrodes 10A and 10B receive electrostatic repelling force and electrostatic repulsive force in the same direction. In this process, the electrostatic-type ultrasonic transducer 1 is controlled such that the mechanical oscillation resonance frequency of the oscillation film 12 agrees with the acoustic resonance frequency of the through holes 14. This will be specifically discussed later.

By this method, the oscillation film 12 receives electrostatic repelling force and electrostatic repulsive force in the same direction with the direction of action of the electrostatic force alternately changing. Thus, large film oscillation, that is, acoustic signals at a sufficient sound pressure level for obtaining parametric array effect can be generated. Moreover, oscillation symmetry can be secured. Accordingly, high sound pressure can be generated in a wide frequency band.

The thickness of a pair of the fixed electrodes of the electrostatic-type ultrasonic transducer 1 is determined such that the through holes 14 formed on the fixed electrodes function as resonance pipes, and the electrostatic-type ultrasonic transducer 1 is controlled such that the mechanical oscillation resonance frequency of the oscillation film 12 agrees with the acoustic resonance frequency of the through holes 14. As a result, intensive ultrasonic waves can be generated in a wide frequency band, and thus conversion efficiency between electric and acoustic energies can be improved.

Therefore, the ultrasonic transducer 1 in the embodiment according to the invention the oscillation film 12 of which receives forces from a pair of the fixed electrodes 10A and 10B and oscillates thereby is called a push-pull-type transducer.

The ultrasonic transducer 1 in the embodiment according to the invention generates higher sound pressure in a wider band range than the conventional electrostatic-type ultrasonic transducer (pull type) in which only electrostatic attraction force acts on the oscillation film.

Figure 17:
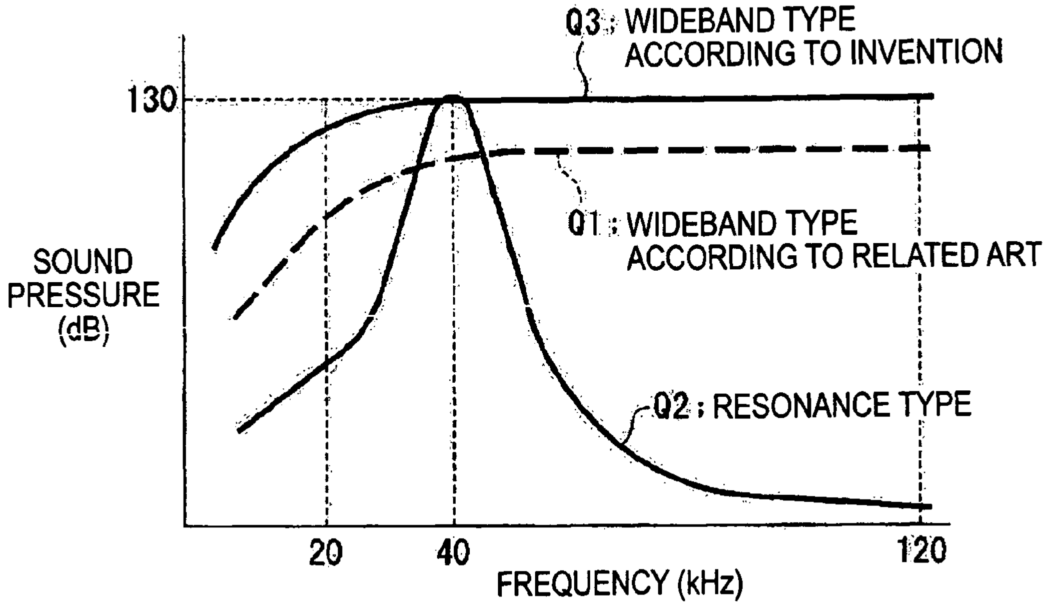
[FIG. 17]

The frequency characteristics of the ultrasonic transducer in the embodiment according to the invention are shown in FIG. 17. In the figure, a curve Q3 corresponds to the frequency characteristics of the ultrasonic transducer in this embodiment. As apparent from the figure, a high sound pressure level can be achieved in a wider frequency band compared with the frequency characteristics of the conventional wideband-type electrostatic-type ultrasonic transducer. More specifically, sound pressure at a level of 120 dB or higher sufficient for obtaining the parametric effect can be generated in a frequency band range from 20 kHz to 120 kHz.

According to the ultrasonic transducer 1 in the embodiment of the invention, the thin oscillation film 12 sandwiched between a pair of the fixed electrodes 10A and 10B receives both electrostatic attraction force and electrostatic repulsive force. Thus, large oscillations can be produced, and high sound pressure can be generated in a wide band range since oscillation symmetry can be maintained.

Figure 2:
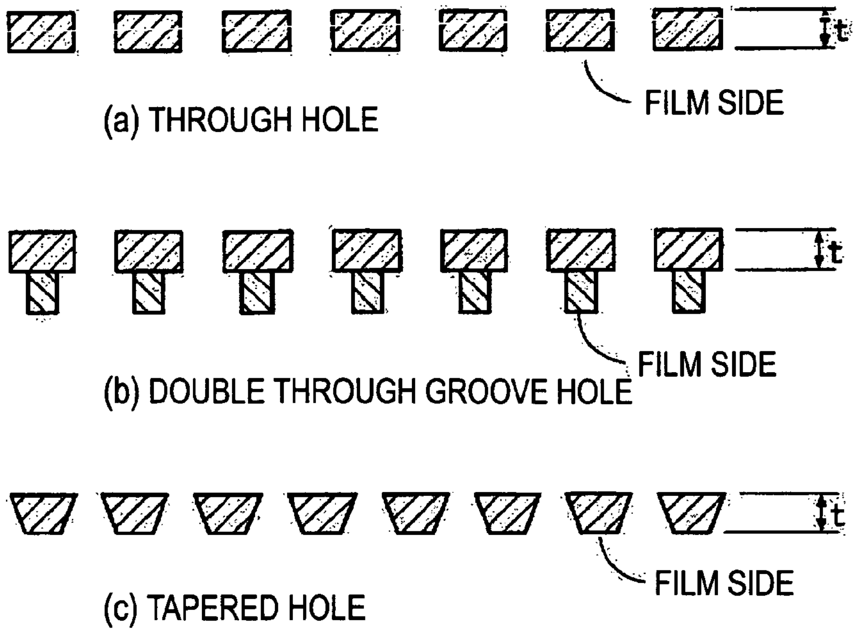
[FIG. 2] FIGS. 2(*a*) through 2(*c*) show specific examples of a shape of a fixed electrode in the ultrasonic transducer in the embodiment according to the invention.

Next, the fixed electrodes of the ultrasonic transducer in this embodiment are described. FIGS. 2(*a*) through 2(*c*) illustrate several structure examples (cross sections) of the cylindrical fixed electrode (only one of two fixed electrodes)

FIG. 2(*a*) shows a through hole type. More specifically, the holes formed on a pair of the fixed electrodes 10A and 10B are cylindrical through holes. The fixed electrode having this type of through holes can be manufactured most easily, but has no electrode part opposed to the oscillation film 12. Thus, this fixed electrode has a drawback that only weak electrostatic force is generated.

FIG. 2(*b*) illustrates a structure of the fixed electrode having a double through hole structure. According to this structure, the holes formed on a pair of the fixed electrodes 10A and 10B are through holes each of which is constituted by at least two types (two types in this embodiment) of concentric and cylindrical holes having different sizes in diameter and depth. Each type of the holes is formed successively from the other hole type. The holes provided on the fixed electrode have larger hole diameters and smaller depths on the oscillation film side than those on the side opposite to the oscillation film.

In this case, the parts disposed in parallel with the edges of the holes are opposed to the oscillation film 12, and these parts constitute parallel plate capacitors.

Since pulling up force and pushing down force are simultaneously applied to the edges of the oscillation film 12, the oscillations of the film can be increased. FIG. 2(*c*) illustrates through holes each having a tapered cross section. Similar advantages to those of the structure shown in FIG. 2(*b*) can be provided when the fixed electrode has this shape.

Figure 3:
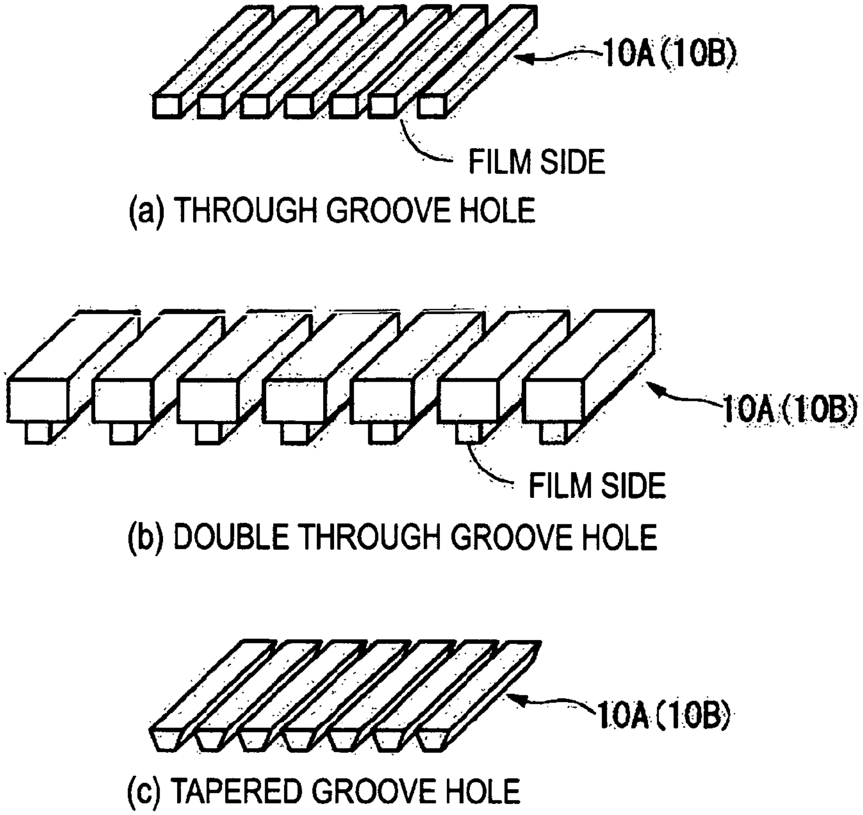
[FIG. 3] FIGS. 3(*a*) through 3(*c*) show specific examples of a through groove structure of the fixed electrode in the ultrasonic transducer in the embodiment according to the invention.

FIGS. 3(*a*) through 3(*c*) illustrate several structure examples of the fixed electrodes (only one of two electrodes) having groove-shaped through holes. FIG. 3(*a*) shows a through groove hole type, and each of the holes formed on a pair of the fixed electrodes 10A and 10B has a rectangular shape in the plan view and rectangular cross sections. The fixed electrode having this type of through holes can also be manufactured most easily. However, since no electrode part opposed to the oscillation film 12, this fixed electrode has a drawback that only weak electrostatic force is generated.

FIG. 3(*b*) illustrates a structure of the fixed electrode having a double through groove hole structure. According to this structure, the holes formed on a pair of the fixed electrodes 10A and 10B are through holes each of which is constituted by at least two types (two types in this embodiment) of rectangular holes in the plan view formed on the same center line and having the same length and different sizes in diameter and depth. Each type of the holes is formed successively from the other hole type.

In this case, similarly to the case of the round hole structure, the parts disposed in parallel with the edges of the respective groove holes are opposed to the oscillation film 12, and these parts constitute parallel plate capacitors.

Since pulling up force and pushing down force are simultaneously applied to the edges of the oscillation film 12, the oscillations of the film can be increased.

FIG. 3(*c*) shows tapered through groove holes. According to this structure, through holes having rectangular shapes in the plan view and tapered cross sections are formed on a pair of the fixed electrodes 10A and 10B. Similar advantages to those of the structure of the fixed electrode shown in FIG. 3(*b*) can be provided when the fixed electrode has this shape.

In the structures shown in FIGS. 3(*b*) and 3(*c*), the rectangular holes formed on the fixed electrode have larger widths and smaller depths on the oscillation film side than those on the side opposite to the oscillation film.

The plural through holes formed on the fixed electrode in the respective structure examples shown in FIGS. 2(*a*) through 2(*c*) and FIGS. 3(*a*) through 3(*c*) may have equal sizes.

Alternatively, the plural through holes may have the same sizes at the respective opposed positions, and different hole sizes at positions not opposed to each other.

The fixed electrodes included in the ultrasonic transducer in this embodiment may be constituted by a single conductive material, or by a plurality of conductive materials.

The fixed electrodes included in the ultrasonic transducer in this embodiment may be constituted by both a conductive material and an insulating material.

More specifically, the materials of the ultrasonic transducer in this embodiment may be any materials as long as they are conductive. For example, the materials may have a simple substance structure such as SUS, brass, iron, and nickel. For reducing weight, a glass epoxy substrate or a paper phenol substrate generally used for a circuit board may be plated with nickel, gold, silver, copper or other materials after desired holes are formed on the board. In this case, plating both surfaces of the board is effective for preventing warping of the board after molding.

However, when a double-side electrode evaporation film or an electret film is used as the oscillation film 12, some insulation treatment is necessary for a pair of the fixed electrodes 10A and 10B on the oscillation film 12 side in the ultrasonic transducer 1 shown in FIG. 1. For example, the fixed electrodes 10A and 10B need to be coated with insulation thin films such as alumina, silicon polymer materials, amorphous carbon films, and SiO2.

Next, the oscillation film 12 is discussed. The oscillation film 12 constantly accumulates charges having the same polarity (polarity may be either positive or negative), and oscillates by electrostatic force between the fixed electrodes 10A and 10B which varies in accordance with AC voltage. A specific structure example of the oscillation film 12 in the ultrasonic transducer in the embodiment according to the invention is now explained with reference to FIGS. 4(*a*) through 4(*c*).

Figure 4:
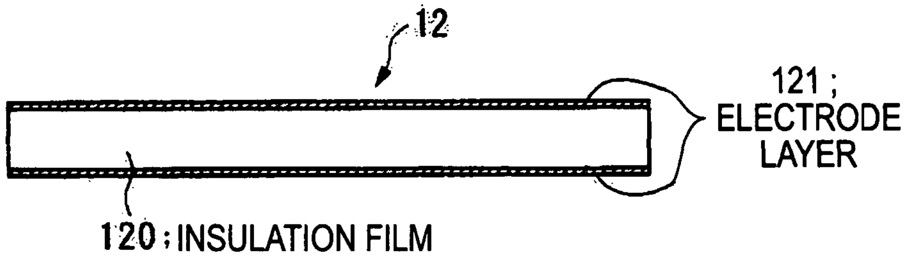
[FIG. 4] FIGS. 4(*a*) through 4(*c*) show specific examples of a structure of an oscillation film in the ultrasonic transducer in the embodiment according to the invention.
Figure 4:
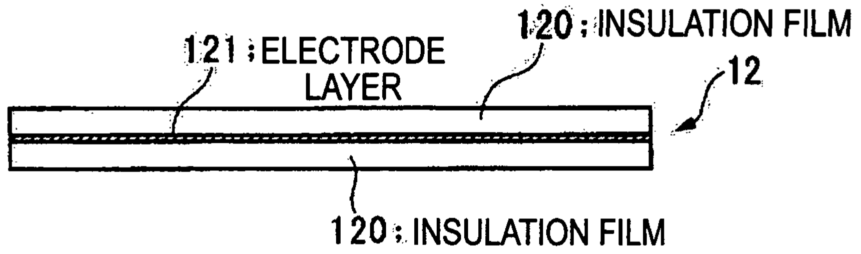
Figure 4:
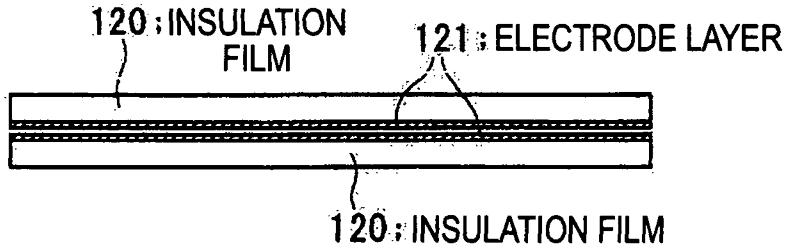

FIG. 4(*a*) shows a cross-sectional structure of the oscillation film 12 which has the electrode layer 121 formed by electrode evaporation on both surfaces of the insulation film 120. The insulation film 120 at the center is preferably made of polymeric materials such as polyethylene terephthalate (PET), polyester, polyethylene naphthalate (PEN), polyphenylene sulfide (PPS) in view of expandability and contractility and electric pressure resistance.

Al is most typically used for electrode evaporation forming the electrode layer 121. Other preferable materials are Ni, Cu, SUS, Ti and other materials in view of compatibility with the polymeric materials discussed above and cost performance, and for other reasons. The optimal thickness of the insulating polymeric film as the insulation film 120 forming the oscillation film 12 differs depending on the operation frequencies and the hole sizes formed on the fixed electrodes, and thus cannot be determined unconditionally. In general, the thickness is almost preferable when it is in the range from 1 μm to 100 μm.

The thickness of the electrode-evaporated layer as the electrode layer 121 is preferably within the range from 40 nm to 200 nm. Few charges are accumulated when the electrode is too thin. On the contrary, the film is hardened and thus the amplitude is reduced when the electrode is too thick. The material of the electrode may be a transparent conductive film ITO/In, Sn, Zn oxides or others.

FIG. 4(*b*) shows a structure where the electrode layer 121 is sandwiched between insulating polymeric films as the insulating films 120. In this case, the thickness of the electrode layer 121 is preferably in the range from 40 nm to 200 nm similarly to the case shown in FIG. 4(*a*). The material and the thickness of the insulating films 120 into which the electrode layer 121 is inserted are preferably selected from polyethylene terephthalate (PET), polyester, polyethylene naphthalate (PEN), and polyphenylene sulfide (PPS), and in the range from 1 μm to 100 μm similarly to the double-side electrode-evaporation film shown in FIG. 4(*a*), FIG. 4(*c*) shows a structure where two sheets of one-side electrode evaporation film are affixed to each other with the electrode side contacting the other electrode side. In this case, the requirements for the insulation film and the electrode section are preferably the same as those of other types of oscillation film discussed above. DC bias voltage of several hundreds volts needs to be applied to the oscillation film 12, but this bias voltage can be reduced when the oscillation film 12 is fixed by applying tension on the film surface in the right-angled four directions at the time of manufacture of the film unit.

By applying tension to the film in advance, the same effect as that of pulling tension which is produced by applying bias voltage in the related art can be obtained. This is an extremely effective method for reducing voltage.

In this case, Al is most typically used as the film electrode material. Other preferable materials are Ni, Cu, SUS, Ti and other materials in view of compatibility with the polymeric materials and cost performance and for other reasons similarly to the above case. Transparent conductive films ITO/In, Sn, Zn oxides or others may be used.

Preferable fixing materials for fixing the fixed electrodes or the oscillation film are plastic materials such as acrylic, bakelite, polyacetal (polyoxymethylene) resin (POM) in view of lightweight and non-conductivity.

Next, the main part structure of the electrostatic-type ultrasonic transducer in the embodiment according to the invention is described. As apparent from the structure of the fixed electrodes discussed above with reference to FIGS. 2(*a*) through 2(*c*) and 3(*a*) through 3(*c*), the thickness t of one or both of the two fixed electrodes 10A and 10B in the embodiment according to the invention is determined such that the parts corresponding to the thicknesses of the fixed electrodes form resonance pipes as acoustic pipes producing resonance phenomenon (see FIGS. 2(*a*) through 2(*c*)).

Figure 5:
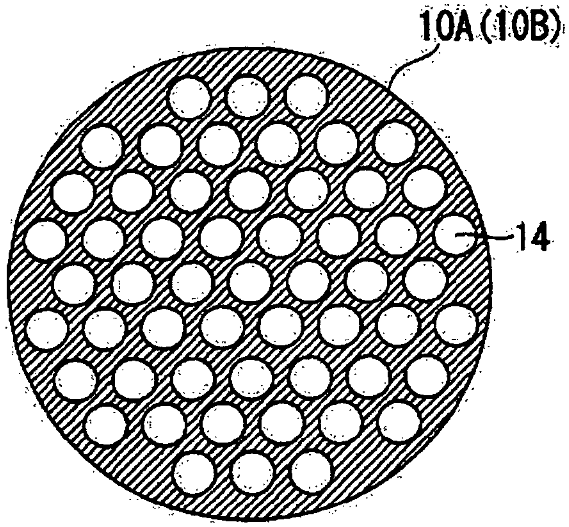
[FIG. 5]

FIG. 5 is a plan view of the fixed electrode (resonance pipe unit) 10A (10B) having the through holes (resonance pipes) 14. The figure shows an arrangement example of the through holes formed on the fixed electrode 10A (10B). The arrangement of the through holes is not limited to a regular arrangement as shown in FIG. 5.

The length of the through holes corresponds to the length t as the thickness of the fixed electrode in most cases for the structural reason. Thus, for using the through hole parts of the fixed electrode as resonance pipes, the length t as the thickness of the fixed electrode needs to be determined such that resonance pipes can be formed.

Figure 6:
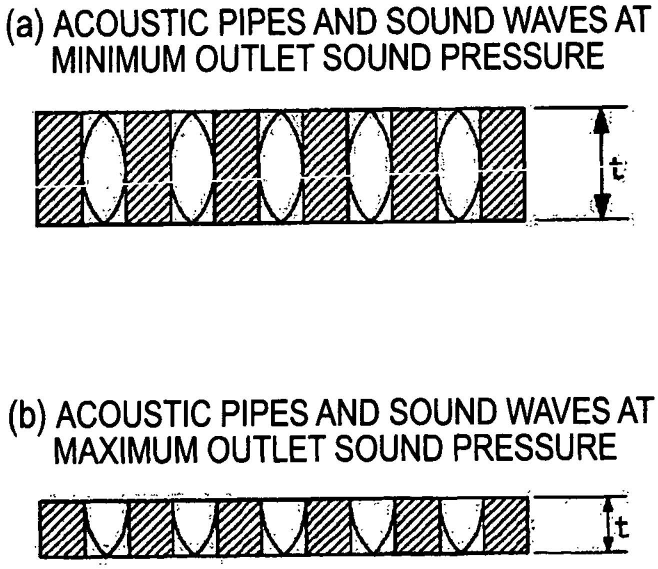
[FIG. 6] FIGS. 6(*a*) and 6(*b*) are front cross-sectional views showing resonance conditions of sounds in the fixed electrode as a resonance pipe unit formed by a collection of resonance pipes.

FIGS. 6(*a*) and 6(*b*) are front cross-sectional views showing sound resonance conditions of the fixed electrode as the resonance pipe unit constituted by a collection of resonance pipes. In the figure, t indicates the length of the resonance pipes, and transmission of sound waves having ½ wavelength is shown in this example.

The minimum wavelength unit for producing resonance phenomenon is ½ wavelength, and a theoretical equation of the resonance phenomenon at the ends of both end openings is shown below. When f is ultrasonic frequency, c is speed of sound (about 340 m/s), and λ is wavelength, the following relation holds:

$$\lambda = mc/f (m\text{: integer}) \tag{1}$$

When the optimal acoustic pipe length is λopt and n is an odd natural number, the optical acoustic pipe length can be represented as:

$$\lambda opt = nc/4f \tag{2}$$

The sound pressure becomes the maximum at the outlets of the acoustic pipes when the wavelength λ satisfies the equation (2), and this length corresponds to the acoustic pipe (resonance pipe) length to be calculated, i.e., the length t as the thickness of the fixed electrode. The size of the fixed electrode is reduced to the smallest in the structure shown in FIG. 6(*b*), but the value t may be any values obtained by multiplying ¼ wavelength by positive natural numbers.

In the embodiment according to the invention (first embodiment), when the wavelength calculated from the resonance frequency as the mechanical oscillation resonance point of the oscillation film 12 in the electrostatic-type ultrasonic transducer 1 is λ, for example, the respective thicknesses t of a pair of the fixed electrodes 10A and 10B are determined as (λ/4)·n or substantially (λ/4)·n (where λ: wavelength of ultrasonic wave, n: positive odd number). The electrostatic-type ultrasonic transducer having this structure according to the invention has the plural through holes 14 at the opposed positions of the first fixed electrode 10A and the second fixed electrode 10B. The AC signals as operation signals are applied to a pair of the fixed electrodes constituted by the first and second fixed electrodes 10A and 10B while DC bias voltage is being applied to the conductive layer 121 of the oscillation film 12. As a result, the oscillation film 12 sandwiched between the two fixed electrodes 10A and 10B simultaneously receive electrostatic attraction force and electrostatic repulsive force in the same direction in accordance with the direction of the polarity of the AC signals. Thus, the oscillations of the oscillation film 12 can be increased to a level sufficient for obtaining the parametric effect, and also the symmetry of the oscillations can be secured. Accordingly, high sound pressure can be generated in a wide frequency band range.

Furthermore, when the wavelength calculated from the resonance frequency as the mechanical oscillation resonance point of the oscillation film 12 in the electrostatic-type ultrasonic transducer 1 is λ, the respective thicknesses t of a pair of the fixed electrodes are determined as (λ/4)·n or substantially (λ/4)·n (where ): wavelength of ultrasonic wave, n: positive odd number). Thus, the mechanical oscillation resonance frequency of the oscillation film 12 agrees with the acoustic resonance frequency, and the parts corresponding to the thickness of the through holes of the respective fixed electrodes constitute resonance pipes. Accordingly, sound pressure becomes the maximum in the vicinity of the outlets of the fixed electrodes, and more intensive ultrasonic waves can be generated under the same operation conditions in the push-pull-type ultrasonic transducer. That is, the conversion efficiency between electric and acoustic energies can be improved in the push-pull-type ultrasonic transducer.

In an example of the sufficient thickness of the fixed electrode functioning as resonance pipes, the wavelength is 8.5 mm when the frequency of the ultrasonic waves is 40 kHz, and thus the sufficient resonance pipe length (fixed electrode thickness) t is 2.125 mm equal to ¼ of the wavelength. Since ultrasonic waves are to be generated, the wavelength becomes 17 mm when the reference frequency is 20 kHz. Thus, the sufficient resonance pipe length (fixed electrode length) t is 4.25 mm equal to ¼ of the wavelength.

When the reference frequency is 100 kHz, the wavelength is 3.4 mm. Thus, the sufficient resonance pipe length (fixed electrode thickness) t is 0.85 mm equal to ¼ of the wavelength.

Figure 7A:
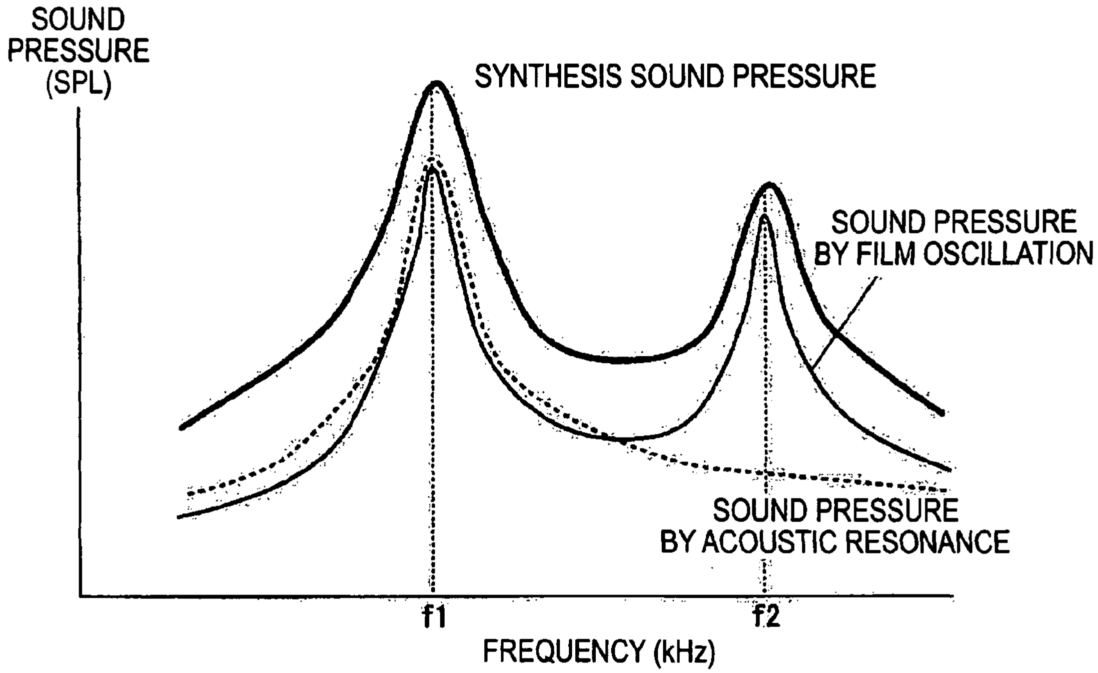
FIGS. 7(A) and 7(B) show relations between frequency and sound pressure generated by mechanical oscillation resonance of the oscillation film, sound pressure generated by acoustic resonance, and synthesis sound pressure of these sound pressures (final output sound pressure).
Figure 7B:
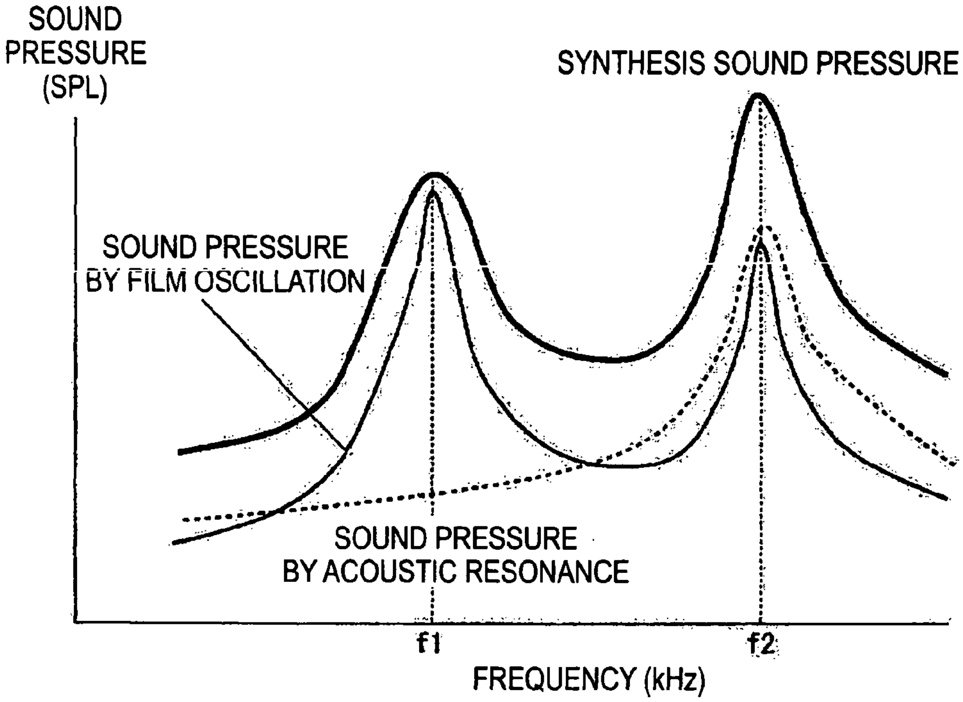

FIGS. 7(A) and 7(B) show respective relationships between frequency and sound pressure generated by mechanical oscillation resonance of the oscillation film, sound pressure by acoustic resonance, and synthesis sound pressure of these. FIG. 7(A) shows the case where the acoustic resonance frequency agrees with the primary resonance frequency of the mechanical oscillation of the oscillation film. In FIG. 7(B), when the diameter of the oscillation film is 1,500 μm, the thickness is 12 μm, the acoustic pipe diameter is 750 μm, and the length is 1.1 μm, for example, the mechanical oscillation resonance frequency (primary resonance frequency) f1 of the oscillation film is around 30 kHz. The case in which the primary resonance frequency f1 of the mechanical oscillation of the oscillation film agrees with the acoustic resonance frequency of the through holes is shown in FIG. 7(A). However, high sound pressure can be generated when the secondary resonance frequency f2 of the mechanical oscillation of the oscillation film agrees with the acoustic resonance frequency of the through holes as shown in FIG. 7(B) other than the case in which the primary resonance frequency f1 of the mechanical oscillation of the oscillation film agrees with the acoustic resonance frequency of the through holes.

Actually, for providing the through holes of the fixed electrode functioning as resonance pipes, the thickness t of the fixed electrode is preferably selected from values in a certain range as shown by the following equation (3):

$$(\lambda/4)\cdot n-\lambda/8\leq t\leq(\lambda/4)\cdot n+\lambda/8 \quad (3)$$

where λ is wavelength of ultrasonic wave (Hz), and n is positive odd number. Also, the following equation holds:

$$\lambda=c/f \quad (4)$$

where c is speed of sound, and c=331.3+0.6T (m/s) (T: air temperature (°C.), f: frequency of ultrasonic wave (Hz))

The equation (3) indicates that the resonance pipe length (fixed electrode thickness) is selected from values in a range of ⅛ wavelength from the optimal value of the resonance pipe length. The ⅛ wavelength corresponds to about 70% of the optimal value, which is the limit value and no great loss is estimated when a value larger than this limit value is selected in view of efficiency.

Figures 8, 9:
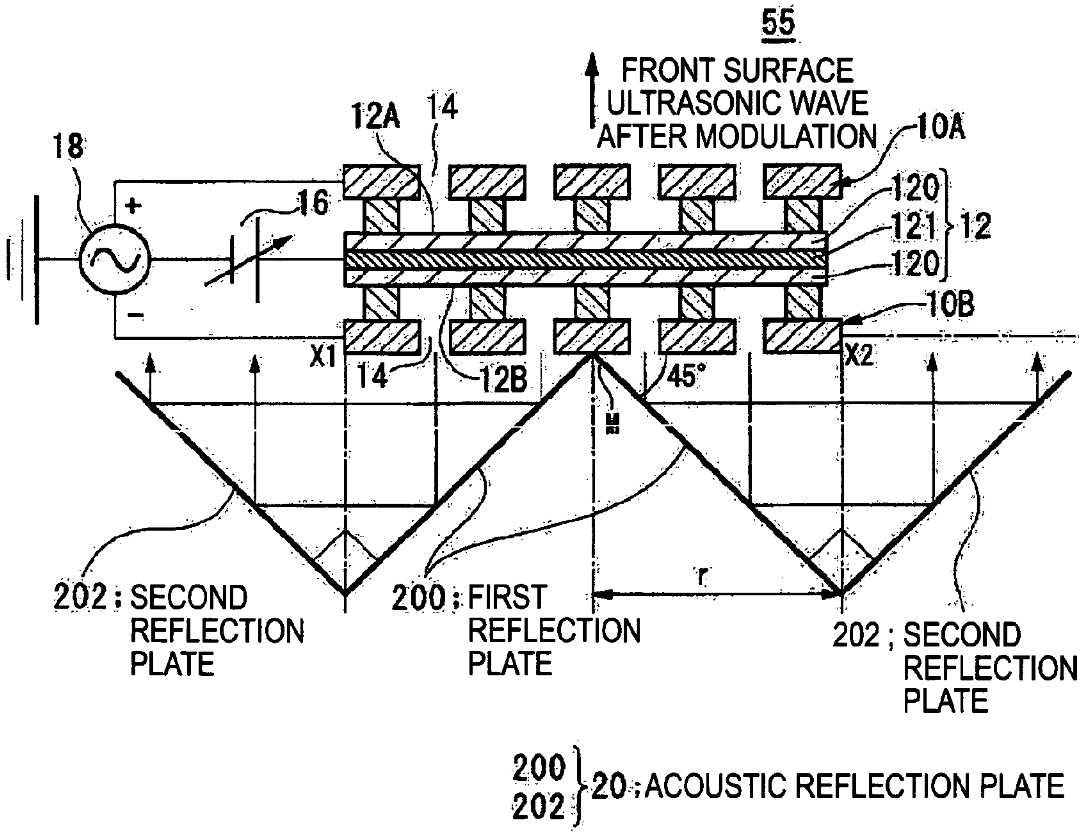
[FIG. 8]
[FIG. 9]

FIG. 8 shows specific examples of relations among the primary resonance frequency of the mechanical oscillation of the oscillation film, the wavelength λ of the carrier wave (ultrasonic frequency band), and the acoustic pipe length. The primary resonance frequency of the mechanical oscillation of the oscillation film in the figure determines parameters for specifying the oscillation film (such as film diameter, film material, and film thickness) to designate the resonance point of the mechanical oscillation of the oscillation film, i.e., the resonance frequency (primary frequency in this example). Then, assuming that the wavelength obtained from the resonance frequency is λ, the carrier wave (ultrasonic wave) frequency f is calculated based on the equation λ=c/f (c: speed of sound) (equation (4)).

Thereafter, the acoustic pipe length (thickness of fixed electrode) is determined using the equation (3). The examples of the numerical values obtained by this method are shown in FIG. 8.

In this embodiment, there is a slight clearance between the bottom of the fixed electrode (resonance pipe unit) 10A and the oscillation film in FIG. 1 (though these components tightly contact each other with no clearance therebetween in the figure). This clearance allows opening end correction, and generally requires a length of 0.6 through 0.85 times larger than the radius of the resonance pipe.

The principle of the invention holds on the assumption that the inside diameter of the resonance pipe is sufficiently smaller than the sound wavelength and that plane waves are generated inside the pipes. In case of the electrostatic-type ultrasonic transducer in the embodiment according to the invention, the ultrasonic waves to be generated are plane waves, and the inside diameter of the pipe is about 2.1 mm at most. Since the inside diameter of the pipe is sufficiently smaller than the wavelength of 17 mm at the frequency of 20 kHz of the ultrasonic waves generated as carrier waves, no problem occurs.

Next, an electrostatic-type ultrasonic transducer in a second embodiment according to the invention is described. In this embodiment, a thickness t1 of one of the two fixed electrodes 10A and 10B of the electrostatic-type ultrasonic transducer 1 shown in FIG. 1 is determined as (λ/4)·n or substantially (λ/4)·n (where λ: wavelength of ultrasonic wave, n: positive odd number), and a thickness t2 of the other fixed electrode is determined as (λ/4)·m or substantially (λ/4)·m (where λ: wavelength of ultrasonic wave, m: positive even number).

The electrostatic-type ultrasonic transducer having this structure has the plural through holes 14 at the opposed positions of the first fixed electrode 10A and the second fixed electrode 10B. The AC signals as operation signals are applied to a pair of the fixed electrodes 10A and 10B constituted by the first and second fixed electrodes 10A and 10B while DC bias voltage is being applied to the conductive layer 121 of the oscillation film 12. As a result, the oscillation film 12 sandwiched between the two fixed electrodes 10A and 10B simultaneously receive electrostatic attraction force and electrostatic repulsive force in the same direction in accordance with the direction of the polarity of the AC signals. Thus, the oscillations of the oscillation film 12 can be increased to a level sufficient for obtaining the parametric effect, and also the symmetry of the oscillations can be secured. Accordingly, high sound pressure can be generated in a wide frequency band range.

Furthermore, when the wavelength calculated from the resonance frequency at the mechanical oscillation resonance point of the oscillation film 12 is λ, the thickness t1 of a pair of the fixed electrodes are determined as (λ/4)·n or substantially (λ/4)·n (where λ: wavelength of ultrasonic wave, n: positive odd number) and the other thickness t2 is determined as (λ/4)·m or substantially (λ/4)·m (where λ: wavelength of ultrasonic wave, m: positive even number). Thus, the parts corresponding to the thickness of the through holes of one fixed electrode (front face) from which sounds having high sound pressure are desired to be released constitute resonance pipes, and the mechanical oscillation resonance frequency of the oscillation film agrees with the acoustic resonance frequency. Accordingly, sound pressure becomes the maximum in the vicinity of the outlets of the through holes of the fixed electrode. On the other hand, at the parts corresponding to the thickness of the through holes of the other fixed electrode (back face) from which no sound release is required, sound pressure becomes the minimum in the vicinity of the outlets of the through holes.

Therefore, more intensive ultrasonic waves can be generated from one fixed electrode (front face side) in a wide frequency band range under the same operation conditions under the same operation conditions in the push-pull-type ultrasonic transducer. In addition, sound release from the other fixed electrode (back face side) can be reduced. That is, the conversion efficiency between electric and acoustic energies can be improved in the push-pull-type ultrasonic transducer.

Similarly to the first embodiment, when the wavelength obtained from the resonance frequency at the mechanical oscillation resonance point of the oscillation film is λ, the thicknesses t1 and t2 of the two fixed electrodes lie in the ranges of $(\lambda/4)\cdot n-\lambda/8 \le t1 \le (\lambda/4)\cdot n+\lambda/8$ (where λ: wavelength of ultrasonic wave, n: positive odd number) and $(\lambda/4)\cdot m-\lambda/8 \le t2 \le (\lambda/4)\cdot m+\lambda/8$ (where λ: wavelength of ultrasonic wave, m: positive even number, t2 is a value only in the range of the right side when m=0), respectively, so that the thicknesses t1 and t2 of the fixed electrodes are selected from values in certain ranges. In this case, similar advantages can also be offered.

According to the electrostatic-type ultrasonic transducer in the embodiment according to the invention, therefore, the thickness of the fixed electrodes of the push-pull-type electrostatic-type ultrasonic transducer is determined such that the through holes of the fixed electrodes can function as resonance pipes by utilizing the resonance phenomenon of sound, and the mechanical oscillation resonance frequency of the oscillation film and the acoustic resonance frequency of the through holes are established such that they agree with each other. Accordingly, more intensive ultrasonic waves can be generated under the same operation conditions. That is, sound pressure at an equivalent level can be generated by the push-pull-type electrostatic-type transducer while consuming less electric energy, which contributes to reduction of voltage (electric power).

Next, the structure of the ultrasonic transducer in the second embodiment according to the invention is described with reference to FIG. 9. The structure of an ultrasonic transducer 55 in the second embodiment according to the invention is similar to that of the ultrasonic transducer shown in FIG. 1 except that an acoustic reflection plate is equipped on the back face of the ultrasonic transducer. More specifically, the ultrasonic transducer 55 in this embodiment includes a pair of the fixed electrodes 10A and 10B having conductive components made of conductive material capable of functioning as electrodes, the oscillation film 12 inserted between a pair of the fixed electrodes 10A and 10B and having the conductive layer 121 to which DC bias voltage is applied, and a member (not shown) for holding a pair of the fixed electrodes 10A and 10B and the oscillation film 12. Each of a pair of the fixed electrodes 10A and 10B has a plurality of and an equal number of holes each of which is opposed to the corresponding hole on the other electrode via the oscillation film 12. AC signals are applied between the conductive components of a pair of the fixed electrodes 10A and 10B. The ultrasonic transducer 55 is characterized by including an acoustic reflection plate 20 on the back face of the ultrasonic transducer. The thickness parts of the through holes of a pair of the fixed electrodes 10A and 10B have the same length t which is determined such that the through holes can function as resonance pipes as discussed above, similarly to the above embodiment.

The acoustic reflection plate 20 is arranged in such a position that ultrasonic waves released from the respective openings of the back face of the ultrasonic transducer 55 reach the front face of the ultrasonic transducer 55 via routes all having the same length.

More specifically, the acoustic reflection plate 20 has a pair of first reflection plates 200, 200 and a pair of second reflection plates. One end of each first reflection plate 200 is positioned at a center position M of the back face of the ultrasonic transducer 55 and extends from the center position as a reference position forming an angle of 45 degrees with respect to the back face of the ultrasonic transducer 55 toward both sides such that the other ends of the first reflection plates 200 correspond to ends X1 and X2 of the ultrasonic transducer 55. The second reflection plates connected to the ends of the first reflection plates 200, 200 extend outward forming right angles such that the second reflection plates have the same length as that of the first reflection plates.

According to this structure, the first reflection plates 200, 200 are arranged to form 45 degrees with respect to the back face of the ultrasonic transducer 55 on both sides of the center M, and are required to have sufficient lengths such that their ends correspond to the ends of the ultrasonic transducer 55. Ultrasonic waves released from the ultrasonic transducer 55 are reflected in the horizontal direction by the first reflection plates 200, 200.

Since the second reflection plates 202, 202 are connected to the outer sides of the corresponding first reflection plates 200, 200 forming right angles, the ultrasonic waves are then released from the sides or from above or below toward the front face of the ultrasonic transducer 55. The second reflection plates are also required to have the same lengths as those of the first reflection plates. The important point is that all the routes of the ultrasonic waves released from the back face of the ultrasonic transducer 55 have the same length. When the route lengths are the same, the phases of the ultrasonic waves released from the back face are all identical. The sound waves can be handled geometrically as shown in FIG. 9 because the sound waves which are ultrasonic waves have extremely high directivity. A further point to be touched upon herein is the time difference between the ultrasonic waves released from the front face of the ultrasonic transducer 55 and the ultrasonic waves released from the back face and reflected toward the front face.

Assuming that the transducer is circular with its radius r, a distance to the front face of the transducer from an ultrasonic wave released from a position having a distance a from the center of the transducer is about 2r which corresponds to the diameter of the transducer. As obvious, the distance a is required to satisfy the following equation:

$$0 \le a \le r \qquad (5)$$

When the diameter of the transducer is about 10 cm and the speed of sound is 340 m/sec, the time difference between the ultrasonic wave released from the front face and the ultrasonic wave released from the back face and reflected toward the front face is about 0.29 msec. This time difference is too short to be recognized by humans, and thus no problem occurs. Therefore, ultrasonic waves released from both the front face and back face of the transducer can be effectively utilized.

[Structure Example of Ultrasonic Wave Speaker According to the Invention]

Figure 10:
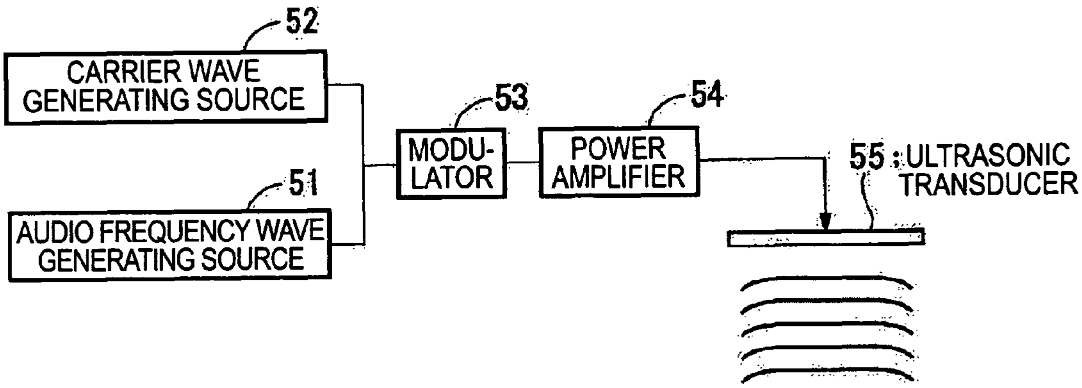
[FIG. 10]

A structure of an ultrasonic speaker in an embodiment according to the invention is shown in FIG. 10. The ultrasonic speaker in this embodiment uses the ultrasonic transducer 55 as the electrostatic-type ultrasonic transducer in the embodiment according to the invention (FIG. 1).

As illustrated in FIG. 10, the ultrasonic speaker in this embodiment includes an audio frequency wave generating source (signal source) 51, a carrier wave generating source (carrier wave supply means) 52 for producing and outputting carrier waves in an ultrasonic frequency band, a modulator (modulating means) 53, a power amplifier 54, an ultrasonic transducer (electrostatic-type transducer) 55.

The modulator 53 modulates carrier waves outputted from the carrier wave generating source 52 by signal waves in an audio frequency band outputted from the audio frequency wave generating source 51, and supplies the modulated carrier waves to the ultrasonic transducer 55 via the power amplifier 54.

In this structure, the modulator 53 modulates the carrier waves in the ultrasonic frequency band outputted from the carrier wave generating source 52 by the signal waves outputted from the audio frequency wave generating source 51, and the ultrasonic transducer 55 is operated based on the modulated signals having been amplified by the power amplifier 54. Thus, the modulation signals are converted into sound waves at a finite amplitude level by the ultrasonic transducer 55, and the converted sound waves are released into a medium (air) so that the original signal sound in the audio frequency band can be self-reproduced by non-linear effect of the medium (air).

Since sound waves are condensational and rarefactional waves which transmit in the air as transmission medium, the condensational part and the rarefactional part of the air become prominent during transmission of the modulated ultrasonic waves. The speed of sound is high in the condensational part, and the speed of sound is low in the rarefactional part. Thus, distortion of the modulated waves is caused, and the modulated waves are separated in waveform into carrier waves (ultrasonic frequency band) and signal waves (signal sound) in the audio wave frequency band. As a result, signal waves (signal sounds) in the audio wave frequency band can be reproduced.

When high sound pressure is secured over a wide band range, the ultrasonic speaker can be used as a speaker for various applications. Ultrasonic waves are considerably attenuated in the air in proportion to the second power of the frequency. Thus, when the carrier frequency (ultrasonic wave) is low, attenuation decreases and the ultrasonic speaker generates sounds in the form of beams which can be transmitted far away.

On the other hand, when the carrier frequency is high, ultrasonic waves are considerably attenuated and the parametric array effect is not sufficiently caused. As a result, the ultrasonic speaker generates sounds which are expandable. These are highly effective functions which allow the ultrasonic speaker to be used in accordance with applications.

Dogs living with humans as pets in many cases can hear sounds at frequencies up to 40 kHz, and cats as similar animals can hear sounds up to 100 kHz. Thus, when a carrier frequency higher than these frequencies is used, effects on pets can be eliminated. In any cases, a number of merits are offered when the speaker operates at various frequencies.

The ultrasonic speaker in the embodiment according to the invention can generate acoustic signals at a sufficiently high sound pressure level for obtaining the parametric array effect in a wide frequency band range.

In addition, the ultrasonic speaker in the embodiment according to the invention uses any of the electrostatic-type ultrasonic transducers shown in the above embodiments. That is, the through holes formed on a pair of the fixed electrodes of the electrostatic-type ultrasonic transducer are used as resonance pipes, and the electrostatic-type ultrasonic transducer is controlled such that the mechanical oscillation resonance frequency of the oscillation film agrees with the acoustic resonance frequency of the through holes. Accordingly, the electrostatic-type ultrasonic transducer can generate intensive ultrasonic waves over a wide frequency band range, and thus improve the conversion efficiency between electric and acoustic energies.

[Description of Structure Example of Superdirectional Acoustic System]

Next, a superdirectional acoustic system according to the invention is described. The superdirectional acoustic system uses the ultrasonic speaker including the push-pull-type electrostatic-type ultrasonic transducer according to the invention which contains the first electrode having the through holes, the second electrode having the through holes each of which is paired with the corresponding through hole of the first electrode, and the oscillation film sandwiched between a pair of the first and second electrodes and having the conductive layer to which DC bias voltage is applied. According to the electrostatic-type ultrasonic transducer having a pair of the electrodes and the oscillation film, when the wavelength obtained from the resonance frequency as the mechanical oscillation resonance point of the oscillation film is λ, each thickness t of the two fixed electrodes is determined as $(\lambda/4)\cdot n$ or substantially $(\lambda/4)\cdot n$ (where λ: wavelength of ultrasonic wave, n: positive odd number). AC signals as modulated waves produced by modulating carrier waves in an ultrasonic frequency band by signal waves in an audio frequency band are applied between a pair of the electrodes.

Hereinafter, a projector as an example of the superdirectional acoustic system according to the invention is discussed. The superdirectional acoustic system of the invention is not limited to a projector but is widely applicable to displays for reproducing sounds and images.

Figure 11:
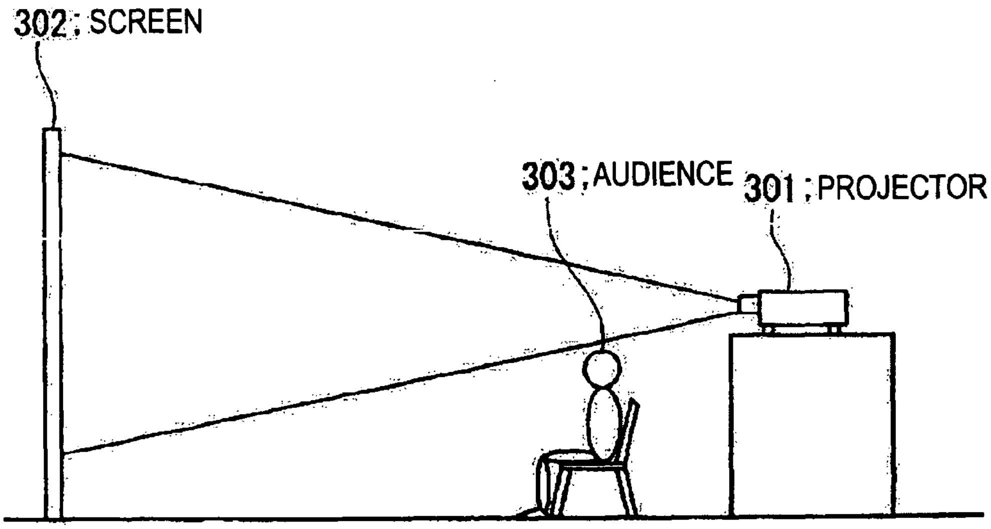
[FIG. 11]

FIG. 11 shows a use condition of the projector according to the invention. As illustrated in this figure, a projector 301 is disposed at the back of an audience 303. This projector 301 projects images on a screen 302 located in front of the audience 303 and forms a virtual sound source on a projection plane of the screen 302 by using an ultrasonic speaker provided on the projector 301 so that sounds can be reproduced.

Figure 12A:
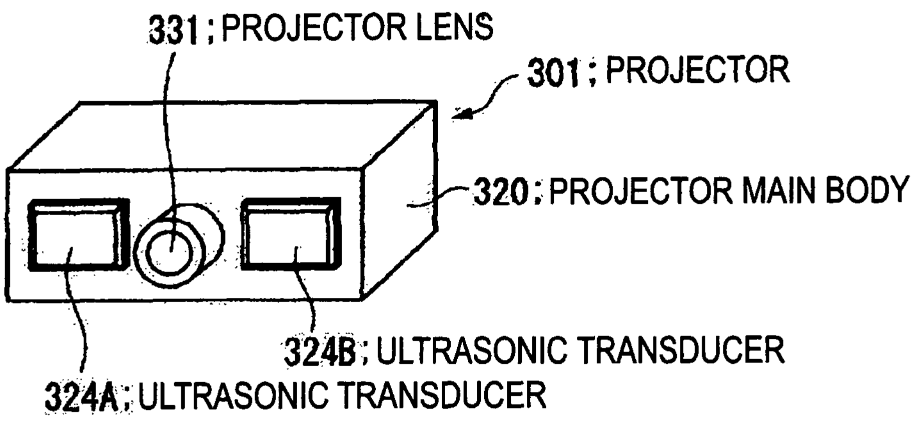
FIGS. 12(A) and 12(B) illustrate an external structure of the projector shown in FIG. 11.
Figure 12B:
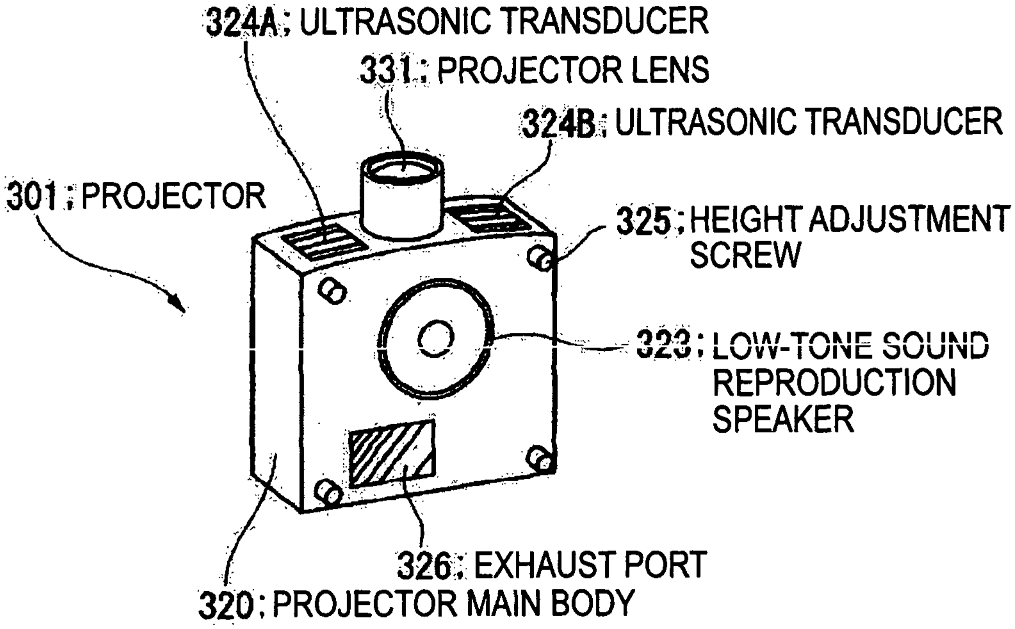

FIG. 12 shows an external structure of the projector 301. The projector 301 includes a projector main body 320 having a projection optical system for projecting images on a projection plane such as a screen, and ultrasonic transducers 324A and 324B capable of generating sound waves in an ultrasonic frequency band. Thus, the ultrasonic speakers for reproducing signal sounds in an audio frequency band from audio signals supplied from the acoustic source are attached to the projector 301 as one piece. In this embodiment, the ultrasonic transducers 324A and 324B constituting ultrasonic speakers on the left and right sides with a projector lens 331 as the projection optical system interposed therebetween are provided on the projector main body.

In addition, a low-tone sound reproduction speaker 323 is equipped on the bottom face of the projector main body 320. Height adjustment screws 325 for adjusting the height of the projector main body 320, and an exhaust port 326 for an air cooling fan are also provided.

The projector 301 uses the push-pull-type electrostatic-type ultrasonic transducers according to the invention as the ultrasonic transducers constituting the ultrasonic speaker, and generates acoustic signals in a wide frequency range (sound waves in an ultrasonic frequency band) with high sound pressure. Accordingly, when spatial reproductive range of the reproduction signals in the audio frequency band is appropriately controlled by varying the frequency of the carrier waves, acoustic effects achieved by a stereo-surround system, a 5.1 ch surround system or the like can be obtained without requiring a large-scale acoustic system which has been required and thus the projector can be a easily portable device.

Figure 13:
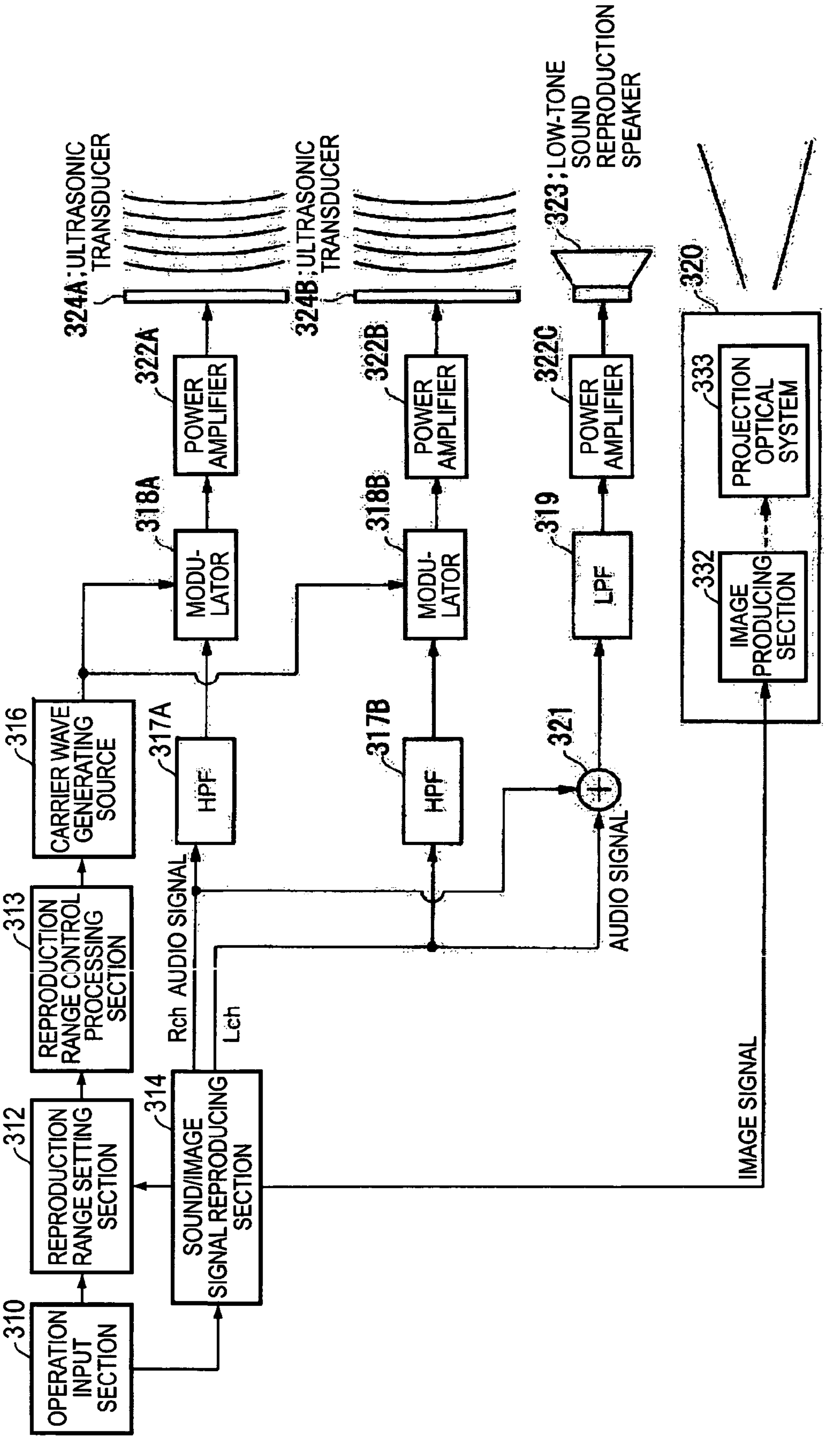
[FIG. 13]

Next, the electric structure of the projector 301 shown in FIG. 13 is described. The projector 301 includes an operation input section 310, a reproduction range setting section 312, a reproduction range control processing section 313, a sound/image signal reproducing section 314, a carrier wave generating source 316, modulators 318A and 318B, and power amplifiers 322A and 322B, ultrasonic speakers constituted by the electrostatic-type ultrasonic transducers 324A and 324B, high pass filters 317A and 317B, a lower pass filter 319, an adder 321, a power amplifier 322C, a low-tone sound reproduction speaker 323, and the projector main body 320. The electrostatic-type ultrasonic transducers 324A and 324B are the push-pull-type electrostatic-type transducer according the invention.

The projector main body 320 has an image producing section 332 for producing images, and a projection optical system 333 for projecting images thus produced on a projection plane. The projector 301 is constituted by the ultrasonic speakers, the low-tone sound reproduction speaker 323, and the projector main body 320 all combined into one piece.

The operation input section 310 has various types of function keys including ten-keys, numeral keys, and a power ON/OFF key. Data for specifying a reproduction range of reproduction signals (signal sounds) can be inputted to the reproduction range setting section 312 by user's key operation of the operation input section 310. When such data is inputted, a frequency of carrier waves for specifying the reproduction signals is set and maintained. The reproduction range of the reproduction signals is determined by setting the transmission distance of the reproduction signals in the release axis direction from the sound wave release planes of the ultrasonic transducers 324A and 324B.

The reproduction range setting section 312 sets the frequency of the carrier waves based on control signals outputted by the sound/image signal reproducing section 314 in accordance with contents of an image.

The reproduction range control processing section 313 has functions of referring to the setting contents of the reproduction range setting section 312, and controlling the carrier wave generating source 316 such that the frequency of the carrier waves produced by the carrier wave generating source 316 lie within the established reproduction range.

For example, when the distance discussed above in correspondence with the carrier wave frequency of 50 kHz is established as the internal information of the reproduction range setting section 312, the carrier wave generating source 316 is so controlled as to generate carrier waves at the frequency of 50 kHz.

The reproduction range control processing section 313 has a storage section which stores in advance a table showing the relationships between the frequencies of the carrier waves and the transmission distances of the reproduction signals in the release axis direction from the sound wave release planes of the ultrasonic transducers 324A and 324B for specifying the reproduction range. The data in this table is obtained by actually measuring the relationships between the frequencies of the carrier waves and the transmission distances of the reproduction signals.

The reproduction range control processing section 313 obtains the frequency of the carrier waves corresponding to the distance information established by referring to the table based on the setting contents of the reproduction range setting section 312, and controls the carrier wave generating source 316 such that the carrier waves have the frequency thus obtained.

The sound/image signal reproducing section 314 is constituted by a DVD player using a DVD as image medium, for example. A audio signal of R channel contained in the reproduced audio signals is outputted to the modulator 318A via the high pass filter 317A, a audio signal of L channel is outputted to the modulator 318B via the high pass filter 317B, and an image signal is outputted to the image producing section 332 of the projector main body 320.

The audio signal of R channel and the audio signal of L channel outputted from the sound/image signal reproducing section 314 are synthesized by the adder 321, and the synthesized signal is inputted to the power amplifier 322C via the low pass filter 319. The sound/image signal reproducing section 314 corresponds to an acoustic source.

The high pass filters 317A and 317B have such a characteristic as to pass only frequency components in the middle-tone and high-tone sound ranges in the audio signals of R channel and L channel, respectively. The low pass filter has such a characteristic as to pass only frequency components in the low-tone sound range in the R channel and L channel.

Thus, the audio signals in the middle-tone and high-tone range in the audio signal of R channel and L channel are reproduced by the ultrasonic transducers 324A and 324B, respectively, and the audio signals in the low-tone range in the audio signals of R channel and L channel are reproduced by the low-tone reproduction speaker 323.

The sound/image signal reproducing section 314 is not limited to a DVD player, but may be a reproduction device for reproducing video signals inputted from the outside. The sound/image signal reproducing section 314 has a function for outputting control signals specifying reproduction ranges to the reproduction range setting section 312 such that acoustic effects corresponding to scenes of reproduced images can be obtained by dynamically varying the reproduction ranges of the reproduced sounds.

The carrier wave generating source 316 has a function for producing carrier waves at a frequency in an ultrasonic frequency range specified by the reproduction range setting section 312 and outputting the produced carrier waves to the modulators 318A and 318B.

The modulators 318A and 318B has a function for modulating amplitude of carrier waves supplied from the carrier wave generating source 316 by audio signals in an audio frequency band outputted from the sound/image signal reproducing section 314 and outputting the modulation signals to the power amplifiers 322A and 322B, respectively.

The ultrasonic transducers 324A and 324B are operated based on the modulation signals outputted from the modulators 318A and 318B via the power amplifiers 322A and 322B, and have a function for releasing the modulation signals into a medium after conversion into sound waves at a finite amplitude level, and reproducing signal sounds (reproduction signals) in an audio frequency band.

The image producing section 332 has a display such as a liquid crystal display and a plasma display panel (PDP), a driving circuit for driving the display based on the image signals outputted from the sound/image signal reproducing section 314, and other components. The image producing section 332 thus produces images to be obtained based on the image signals outputted from the sound/image signal reproducing section 314.

The projection optical system 333 has a function for projecting images, which have been shown on the display, onto the projection plane such as a screen equipped in front of the projector main body 320.

Next, the operation of the projector 301 having this structure is discussed. Initially, data for specifying the reproduction range of reproduction signals (distance information) obtained from the operation input section 310 is inputted to the reproduction range setting section 312 by user's key operation, and a reproduction command is issued to the sound/image signal reproducing section 314.

As a result, the distance information for specifying the reproduction range is inputted to the reproduction range setting section 312. The reproduction range control processing section 313 receives the distance information inputted to the reproduction range setting section 312, and refers to the table stored in the storage section contained in the reproduction range control processing section 313. Then, the reproduction range control processing section 313 obtains a frequency of carrier waves corresponding to the established distance information, and controls the carrier wave generating source 316 such that carrier waves at this frequency can be produced.

Consequently, the carrier wave generating source 316 produces carrier waves at the frequency corresponding to the distance information inputted to the reproduction range setting section 312, and outputs the produced carrier waves to the modulators 318A and 318B.

The sound/image signal producing section 314 outputs audio signals of R channel in reproduced audio signals to the modulator 318A via the high pass filter 317A, and outputs audio signals of L channel to the modulator 318B via the high pass filter 317B. Also, the sound/image signal reproducing section 314 outputs the audio signals of R channel and L channel to the adder 321, and outputs image signals to the image producing section 332 of the projector main body 320.

Thus, the audio signals in the middle-tone and high-tone ranges in the audio signals of R channel are inputted to the modulator 318A by the high pass filter 317A, and the audio signals in the middle-tone and high-tone ranges in the audio signals of L channel are inputted to the modulator 318B by the high pas filter 317B.

The audio signals of R channel and the audio signals of L channel are synthesized by the adder 321, and the audio signals in the low-tone range in the audio signals of R channel and L channel are inputted to the power amplifier 322C by the low pass filter 319.

The image producing section 332 actuates the display based on the inputted image signals to produce and display images. The images displayed on the display are projected onto the projection plane such as the screen 302 shown in FIG. 11 by the projection optical system 333.

The modulator 318A modulates amplitude of the carrier waves outputted from the carrier wave generating source 316 by the audio signals in the middle-tone and high-tone ranges in the audio signals of R channel outputted from the high pass filter 317A, and outputs the modulation signals to the power amplifier 322A.

The modulator 318B modulates amplitude of the carrier waves outputted from the carrier wave generating source 316 by the audio signals in the middle-tone and high-tone ranges in the audio signals of L channel outputted from the high pass filter 317B, and outputs the modulation signals to the power amplifier 322B.

The modulation signals amplified by the power amplifiers 322A and 322B are applied between the upper electrode 10A and the lower electrode 10B of the ultrasonic transducers 324A and 324B, respectively (see FIG. 1). Then, the modulation signals are converted into sound waves at a finite amplitude level (acoustic signals), and released into the medium (air) Consequently, the audio signals in the middle-tone and high-tone ranges in the audio signals of R channel are reproduced from the ultrasonic transducer 324A, and the audio signals in the middle-tone and high-tone ranges in the audio signals of L channel are reproduced from the ultrasonic transducer 324B.

Also, the audio signals in the low-tone range in the audio signals of R and L channels amplified by the power amplifier 322C are reproduced by the low-tone reproduction speaker 323.

As discussed above, in the transmission of ultrasonic waves released into the medium (air) from the ultrasonic transducer, the speed of sound is high at high sound pressure and is low at low sound pressure during transmission. As a result, distortion of waveform is caused.

When the signals in the ultrasonic band range (carrier waves) are modulated (amplitude modulation) by the signals in the audio frequency band before released, the signal waves in the audio frequency band used for modulation are separated from the carrier waves in the ultrasonic frequency band and formed through self-demodulation caused by the waveform distortion. In this process, the reproduction signals expand in beams due to the characteristic of ultrasonic waves, and thus sounds are reproduced only in a particular direction in a manner completely different from the case of an ordinary speaker.

The reproduction signals in beams outputted from the ultrasonic transducers 324 which constitute the ultrasonic speaker are released toward the projection plane (screen) on which images are projected by the projection optical system 333, and reflected by the projection plane to be diffused. In this case, the reproduction range varies since the distance from the sound wave release plane of the ultrasonic transducers 324 to the separation point of the reproduction signals from the carrier waves in the release axis direction (normal direction) and the beam width of the carrier waves (expansion angle of beams) are different depending on the frequencies of the carrier waves established by the reproduction range setting section 312.

Figure 14:
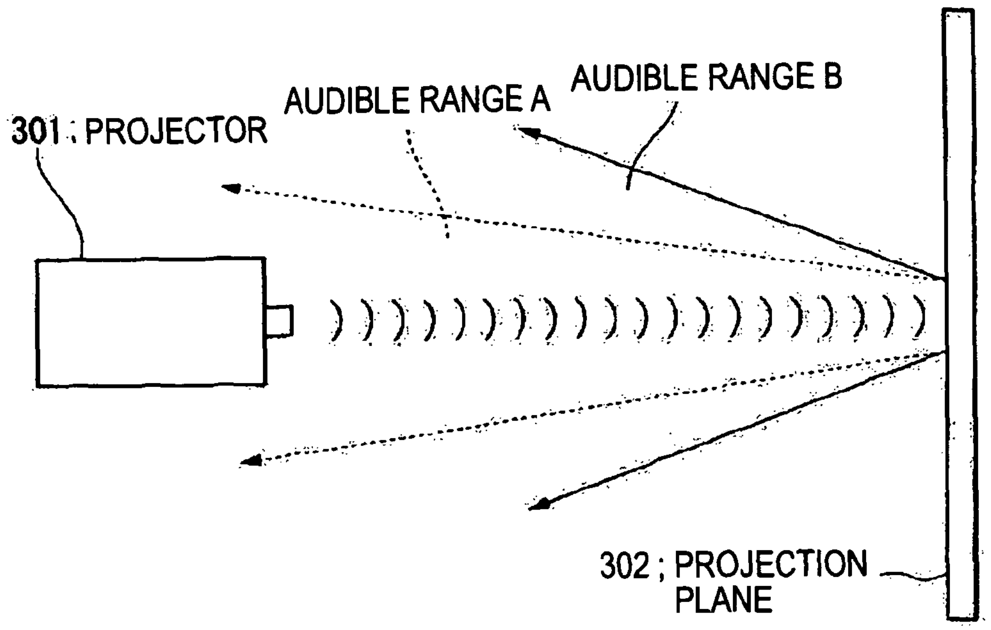
[FIG. 14]
Figure 15:
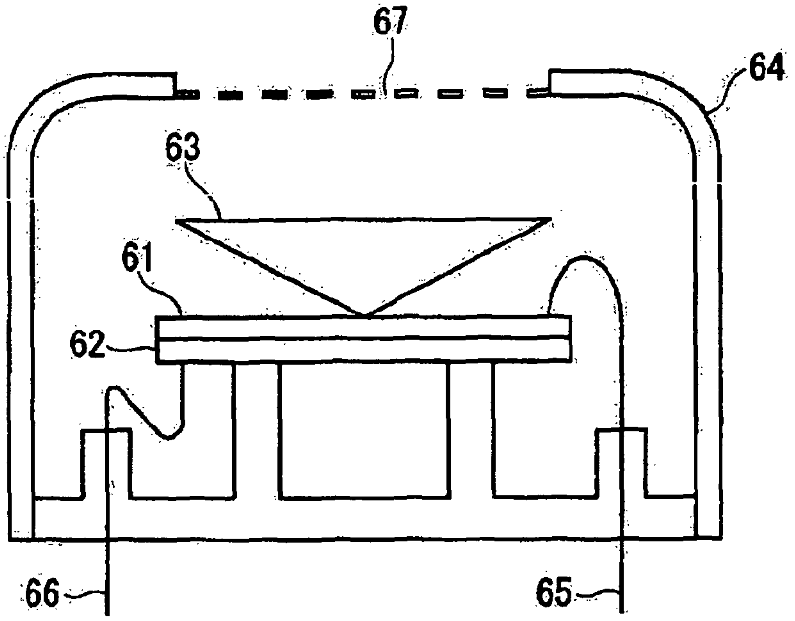
[FIG. 15]
Figure 16:
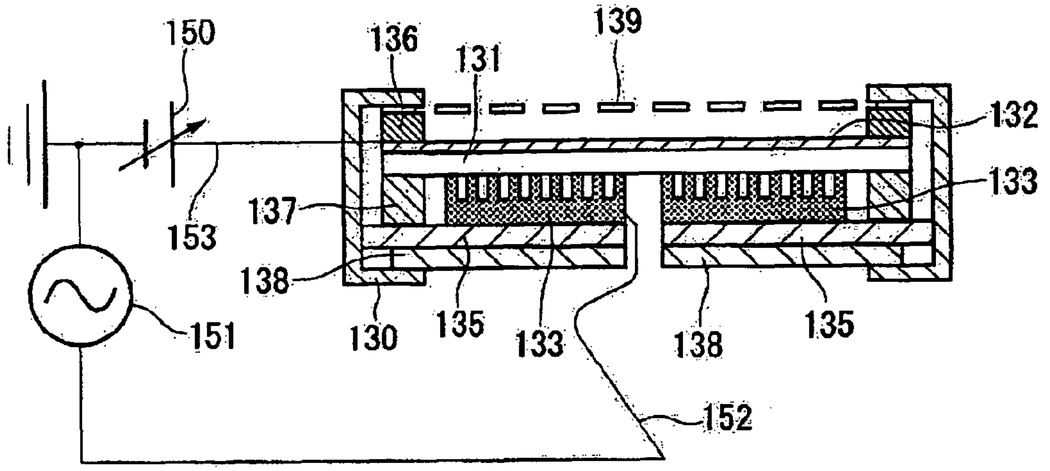
[FIG. 16]

FIG. 14 illustrates a condition of reproduction signals from the ultrasonic speaker including the ultrasonic transducers 324A and 324B in the projector 301 at the time of reproduction. When the carrier frequency set by the reproduction range setting section 312 is low at the time of actuation of the ultrasonic transducer based on the modulation signals produced by modulating the carrier waves by the audio signals, the distance from the sound wave release plane of the ultrasonic transducers 324 to the separation point of the reproduction signals from the carrier waves in the release axis direction (normal direction of sound wave) release plane, that is, the distance to the reproduction point increases.

Thus, the reproduced beams of the reproduction signals in the audio frequency band reach the projection plane (screen) 302 while expanding relatively less, and are then reflected by the projection plane 302 in this condition. As a result, the reproduction range becomes an audible range A indicated by an arrow of a dotted line in FIG. 14. In this case, the reproduction signals (reproduction sounds) can be heard only in a narrow range and relatively far away from the projection plane 302.

When the carrier frequency established by the reproduction range setting section 312 is higher than the above case, the sound waves released from the sound wave release plane of the ultrasonic transducers 324 are narrowed compared with the case of low carrier frequency. In case of high carrier frequency, the distance from the sound wave release plane of the ultrasonic transducers 324 to the separation point of the reproduction signals from the carrier waves in the release axis direction (normal direction of sound wave release plane), that is, the distance to the reproduction point decreases.

Thus, the reproduced beams of the reproduction signals in the audio frequency band expand before reaching the projection plane 302, and are reflected by the projection plane 302 in this condition. As a result, the reproduction range becomes an audible range B indicated by an arrow of a solid line in FIG. 14. In this case, the reproduction signals (reproduction sounds) can be heard in a wide range and relatively near the projection plane 302.

As described above, the projector according to the invention uses the push-pull-type electrostatic-type ultrasonic transducer of the invention or a pull-type electrostatic-type ultrasonic transducer. Thus, audio signals having sufficient sound pressure and wideband characteristics can be generated from a virtual sound source formed in the vicinity of the sound wave reflection plane such as a screen. Accordingly, the reproduction range can be easily controlled. Moreover, as discussed above, the oscillation area of the oscillation film is divided into a plurality of blocks, and the phase of AC signals applied between the electrode layer of the oscillation film and the respective blocks of the oscillation electrode pattern is controlled such that a predetermined phase difference can be obtained between each adjoining pair of the blocks. Accordingly, the directivity of the sounds released from the ultrasonic speaker can be controlled.

Furthermore, the projector of the invention uses the push-pull-type electrostatic-type ultrasonic transducer constructed such that the mechanical oscillation resonance frequency of the oscillation film agrees with the acoustic resonance frequency of the through holes. Accordingly, intensive ultrasonic waves can be generated over a wide frequency band range, and thus the sound quality of the reproduction sounds can be improved.

The electrostatic-type ultrasonic transducer and the ultrasonic speaker according to the invention are not limited to those in the embodiments described and depicted herein. It is therefore understood that various modifications and changes may be given to the invention without departing from the scope thereof.

Industrial Applicability

The ultrasonic transducer in the embodiments according to the invention can be used in various sensors such as a range finder sensor, and can also be used for a sound source of a directional speaker, an ideal impulse signal generating source and the like.

The invention claimed is:

1. An ultrasonic speaker, comprising:

an electrostatic-type ultrasonic transducer which includes a first electrode having through holes, a second electrode having through holes, and an oscillation film which is disposed such that each of the through holes of the first electrode is paired with the corresponding through hole of the second electrode, is sandwiched between a pair of the first and second electrodes, and has a conductive layer to which direct current bias voltage is applied, wherein modulation waves produced by modulating carrier waves in an ultrasonic frequency band by signal waves in an audio frequency band are applied between a pair of the electrodes, and the through holes are resonance pipes that increase sound pressure;

a signal source for that produces signal waves in an audio frequency band;

a carrier wave generating source that produces and outputs carrier waves in an ultrasonic frequency band; and a modulator that modulates the carrier waves by the signal waves in the audio frequency band outputted from the signal source, wherein the electrostatic-type ultrasonic transducer is actuated by modulation signals outputted from the modulator and applied between the electrode layer of the oscillation film and a pair of the electrodes, and wherein an acoustic reflection plate that reflects ultrasonic waves released from respective openings of a back face of the electrostatic-type ultrasonic transducer to a front face of the electrostatic-type ultrasonic transducer by routes all having the same length is provided on the back face of the electrostatic-type ultrasonic transducer.

2. An ultrasonic speaker comprising:

an electrostatic-type ultrasonic transducer, including a first electrode having through holes, a second electrode having through holes, and an oscillation film being disposed such that each of the through holes of the first electrode is paired with the corresponding through hole of the second electrode, being sandwiched between a pair of the first and second electrodes, and having a conductive layer to which direct current bias voltage is applied, wherein when a wavelength obtained from a resonance frequency at a mechanical oscillation resonance point of the oscillation film is λ, a thickness t of the respective fixed electrodes is (λ/4)·n or substantially (λ/4)·n where λ is a wavelength of ultrasonic wave, and n is a positive odd number, and modulation waves produced by modulating carrier waves in an ultrasonic frequency band by signal waves in an audio frequency band are applied between a pair of the electrodes;

a signal source that produces signal waves in an audio frequency band;

a carrier wave generating source that produces and outputs carrier waves in an ultrasonic frequency band; and a modulator that modulates the carrier waves by the signal waves in the audio frequency band outputted from the signal source, wherein the electrostatic-type ultrasonic transducer is actuated by modulation signals outputted from the modulator and applied between the electrode layer of the oscillation film and a pair of the electrodes, wherein the through holes of the first and second electrodes are resonance pipes that increase sound pressure, and wherein an acoustic reflection plate that reflects ultrasonic waves released from respective openings of a back face of the electrostatic-type ultrasonic transducer to a front face of the electrostatic-type ultrasonic transducer by routes all having the same length is provided on the back face of the electrostatic-type ultrasonic transducer.

3. The ultrasonic speaker according to claim 2, wherein the acoustic reflection plate has a pair of first reflection plates and a pair of second reflection plates, one end of each of the first reflection plates being positioned at a center position of the back face of the ultrasonic transducer and extending from the center position as a reference position forming an angle of 45 degrees with respect to the back face of the ultrasonic transducer toward both sides such that the other end of the first reflection plate corresponds to the end of the ultrasonic transducer, and each of the second reflection plates connected to the corresponding end of the first reflection plate extending outward forming right angles such that the second reflection plates have the same length as that of the first reflection plates.

* * * * *